(12) United States Patent
LaPray et al.

(10) Patent No.: US 11,046,840 B2
(45) Date of Patent: Jun. 29, 2021

(54) METHODS FOR LENDING BIODEGRADABILITY TO NON-BIODEGRADABLE PLASTIC MATERIALS

(71) Applicant: BiologiQ, Inc., Idaho Falls, ID (US)

(72) Inventors: Bradford LaPray, Idaho Falls, ID (US); Wenji Quan, Idaho Falls, ID (US); Donald R. Allen, Idaho Falls, ID (US)

(73) Assignee: BIOLOGIQ, INC., Idaho Falls, ID (US)

( * ) Notice: Subject to any disclaimer, the term of this patent is extended or adjusted under 35 U.S.C. 154(b) by 0 days.

(21) Appl. No.: 15/691,588

(22) Filed: Aug. 30, 2017

(65) Prior Publication Data

US 2017/0362418 A1 Dec. 21, 2017

Related U.S. Application Data

(63) Continuation-in-part of application No. 15/481,823, filed on Apr. 7, 2017, and a continuation-in-part of
(Continued)

(51) Int. Cl.
*C08L 23/06* (2006.01)
*C08L 83/04* (2006.01)
*C08L 3/02* (2006.01)

(52) U.S. Cl.
CPC ............... *C08L 23/06* (2013.01); *C08L 3/02* (2013.01); *C08L 83/04* (2013.01);
(Continued)

(58) Field of Classification Search
CPC ....................................................... C08L 23/06
See application file for complete search history.

(56) References Cited

U.S. PATENT DOCUMENTS

| 3,270,874 A | 9/1966 | Hilton |
| 3,865,603 A | 2/1975 | Szymanski |

(Continued)

FOREIGN PATENT DOCUMENTS

| CA | 1031088 | 5/1978 |
| CN | 1603361 | 4/2005 |

(Continued)

OTHER PUBLICATIONS

"Compostable Plastics 101: An Overview of Compostable Plastics Sponsored by the California Organics Recycling Council" based on information and belief, available at least as early as 2012, 23 pages.
(Continued)

*Primary Examiner* — Arrie L Reuther
(74) *Attorney, Agent, or Firm* — Workman Nydegger

(57) ABSTRACT

Described herein are methods for rendering biodegradable a plastic material that is not itself biodegradable, by blending the plastic material with a carbohydrate-based polymeric material that is formed from one or more starches, and a plasticizer (e.g., glycerin). The carbohydrate-based polymeric material is less crystalline than the starting starch materials, e.g., being substantially amorphous, and having a crystallinity of no more than 20%. Third party testing shows blends of such materials render the entire blend biodegradable, believed to be due to the low crystalline substantially amorphous carbohydrate-based polymeric material breaking the hygroscopic barrier associated with the non-biodegradable plastic material, so that when blended together, both the plastic material and the carbohydrate-based polymeric material are biodegradable.

22 Claims, 14 Drawing Sheets

Related U.S. Application Data application No. 15/481,806, filed on Apr. 7, 2017, and a continuation-in-part of application No. 14/853,725, filed on Sep. 14, 2015, and a continuation-in-part of application No. 14/853,780, filed on Sep. 14, 2015.

(60) Provisional application No. 62/442,432, filed on Jan. 4, 2017, provisional application No. 62/440,399, filed on Dec. 29, 2016, provisional application No. 62/187,231, filed on Jun. 30, 2015.

(52) U.S. Cl.
CPC ....... *C08L 2201/06* (2013.01); *C08L 2205/02* (2013.01); *C08L 2205/03* (2013.01); *C08L 2205/035* (2013.01); *C08L 2207/066* (2013.01)

(56) References Cited

U.S. PATENT DOCUMENTS

| | | |
|---|---|---|
| 4,016,117 A | 4/1977 | Griffin |
| 5,026,745 A | 6/1991 | Weil |
| 5,095,054 A | 3/1992 | Lay et al. |
| 5,314,934 A | 5/1994 | Tomka |
| 5,449,708 A | 9/1995 | Schiltz |
| 5,462,983 A | 10/1995 | Bloembergen |
| 5,510,401 A * | 4/1996 | Dehennau ............ C08L 3/02 524/47 |
| 5,714,445 A | 2/1998 | Trinh |
| 6,211,325 B1 | 4/2001 | Sun |
| 6,472,497 B2 | 10/2002 | Loercks et al. |
| 6,605,657 B1 | 8/2003 | Favis et al. |
| 6,783,854 B2 | 8/2004 | Bond |
| 6,818,295 B2 | 11/2004 | Bond et al. |
| 6,841,597 B2 | 1/2005 | Bastioli et al. |
| 6,844,380 B2 | 1/2005 | Favis et al. |
| 6,946,506 B2 | 9/2005 | Bond et al. |
| 7,608,649 B2 * | 10/2009 | Sun ............ C08L 3/02 524/47 |
| 7,666,261 B2 | 2/2010 | Bailey et al. |
| 7,740,952 B2 | 6/2010 | Hausmann |
| 7,998,888 B2 | 8/2011 | Shi |
| 8,188,185 B2 | 5/2012 | Wang |
| 8,232,348 B2 | 7/2012 | Changping |
| 8,283,006 B2 | 10/2012 | Wang |
| 8,329,501 B1 | 12/2012 | Robinson et al. |
| 8,329,601 B2 | 12/2012 | Shi |
| 8,466,337 B2 | 6/2013 | Wang |
| 8,802,754 B2 | 8/2014 | Nie |
| 8,807,254 B2 | 8/2014 | Manus |
| 8,889,945 B2 | 11/2014 | Wang |
| 8,927,611 B2 | 1/2015 | Voolapalli et al. |
| 8,927,617 B2 | 1/2015 | Funk |
| 8,969,224 B2 | 3/2015 | Masuda et al. |
| 9,056,968 B2 | 6/2015 | Matsuo et al. |
| 9,273,207 B2 | 3/2016 | Bastioli |
| 9,327,438 B2 | 5/2016 | Wang |
| 9,464,188 B2 | 10/2016 | Wang |
| 9,884,471 B2 | 2/2018 | Neuman et al. |
| 10,131,783 B2 | 11/2018 | Schmidt et al. |
| 10,214,634 B2 | 2/2019 | Lapray et al. |
| 10,239,292 B2 | 3/2019 | Nissenbaum et al. |
| 10,752,759 B2 | 8/2020 | Lapray et al. |
| 2002/0006989 A1 | 1/2002 | Bastioli |
| 2002/0168517 A1 | 11/2002 | Husemann et al. |
| 2002/0168518 A1 | 11/2002 | Bond et al. |
| 2002/0188041 A1 | 12/2002 | Bond et al. |
| 2003/0077444 A1 | 4/2003 | Bond et al. |
| 2003/0166779 A1 | 9/2003 | Khemani |
| 2007/0129468 A1 | 6/2007 | Bastioli et al. |
| 2008/0103232 A1 | 5/2008 | Lake |
| 2008/0287592 A1 | 11/2008 | Favis |
| 2009/0048368 A1 | 2/2009 | Bash |
| 2010/0159777 A1 | 6/2010 | Wang |
| 2010/0311874 A1 * | 12/2010 | Mentink ............ C08G 18/3206 524/48 |
| 2011/0287929 A1 | 11/2011 | Smith |
| 2012/0059097 A1 | 3/2012 | Liao |
| 2012/0139154 A1 | 6/2012 | Huneault |
| 2012/0283364 A1 | 11/2012 | Sarazin et al. |
| 2012/0316257 A1 | 12/2012 | Bastioli |
| 2013/0001289 A1 | 1/2013 | Tedford |
| 2013/0157031 A1 | 6/2013 | Wang |
| 2013/0157032 A1 | 6/2013 | Wang |
| 2014/0011921 A1 | 1/2014 | Bash |
| 2014/0079935 A1 | 3/2014 | Broyles |
| 2014/0272370 A1 | 9/2014 | Broyles |
| 2016/0107426 A1 | 4/2016 | Leufgens |
| 2017/0002184 A1 | 1/2017 | Lapray et al. |
| 2017/0002185 A1 | 1/2017 | Lapray et al. |
| 2017/0210889 A1 | 7/2017 | LaPray |
| 2017/0218184 A1 | 8/2017 | LaPray |
| 2017/0283597 A1 | 10/2017 | LaPray |
| 2018/0100060 A1 | 4/2018 | LaPray |
| 2019/0194426 A1 | 6/2019 | Lapray et al. |
| 2019/0256681 A1 | 8/2019 | Lapray et al. |
| 2019/0276664 A1 | 9/2019 | LaPray |
| 2019/0315942 A1 | 10/2019 | LaPray |
| 2019/0315947 A1 | 10/2019 | LaPray |
| 2020/0339781 A1 | 10/2020 | Lapray et al. |
| 2020/0339784 A1 | 10/2020 | Lapray et al. |
| 2020/0339803 A1 | 10/2020 | Allen et al. |
| 2020/0377705 A1 | 12/2020 | LaPray et al. |

FOREIGN PATENT DOCUMENTS

| | | |
|---|---|---|
| CN | 101589097 | 11/2009 |
| CN | 102153786 A | 8/2011 |
| CN | 102329436 A | 1/2012 |
| CN | 101805499 | 5/2012 |
| CN | 102850626 | 1/2013 |
| CN | 103289165 | 9/2013 |
| CN | 103819794 A | 5/2014 |
| CN | 103987504 | 8/2014 |
| CN | 103998195 | 8/2014 |
| CN | 105966014 | 9/2016 |
| CN | 103627153 | 2/2018 |
| CN | 107793619 A | 3/2018 |
| CN | 105670239 | 6/2018 |
| CN | 108276744 | 7/2018 |
| EP | 326517 | 7/1994 |
| EP | 1930487 A1 | 6/2008 |
| EP | 2762307 | 8/2014 |
| GB | 2272699 | 5/1994 |
| JP | S49055740 | 5/1974 |
| JP | S50086543 | 7/1975 |
| JP | H07126449 | 5/1995 |
| JP | H07258488 | 10/1995 |
| JP | H09041224 | 2/1997 |
| JP | 10-259083 A | 9/1998 |
| JP | H11322962 | 11/1999 |
| JP | 2003518541 | 6/2003 |
| JP | 3539955 | 7/2004 |
| JP | 2005089718 | 4/2005 |
| JP | 2005264111 | 9/2005 |
| JP | 2008-013602 A | 1/2008 |
| JP | 2010150305 | 7/2010 |
| JP | 2010260923 | 11/2010 |
| JP | 2011042032 | 3/2011 |
| JP | 2011511121 | 4/2011 |
| JP | 2011213836 | 10/2011 |
| JP | 2012148507 | 8/2012 |
| JP | 5544303 | 7/2014 |
| JP | 2018502744 | 2/2018 |
| JP | 2018525467 | 9/2018 |
| TW | 201538529 | 10/2015 |
| WO | 0148078 | 7/2001 |
| WO | 2003014164 | 11/2004 |
| WO | 2006116861 | 11/2006 |
| WO | 2007027163 | 3/2007 |
| WO | 2009073197 | 6/2009 |
| WO | 2009103052 | 8/2009 |
| WO | 2011020170 | 2/2011 |
| WO | 2012088585 | 7/2012 |
| WO | 2013116945 | 8/2013 |

(56) References Cited

FOREIGN PATENT DOCUMENTS

| WO | 2014089321 | 6/2014 |
|----|------------|--------|
| WO | 2014/190935 A1 | 12/2014 |
| WO | 2014190395 | 12/2014 |
| WO | 2015028943 | 3/2015 |
| WO | 2016109196 | 7/2016 |
| WO | 2016/134994 A1 | 9/2016 |
| WO | 2018/125897 A1 | 7/2018 |
| WO | 2018187784 | 10/2018 |

OTHER PUBLICATIONS

Yoshida, et al., "A Bacterium that Degrades and Assimilates Poly(ehylene terphthalate)" Sciense Magazine vol. 351 Issue 6278 Mar. 11, 2016 pp. 1196-1199.

"Discover Polysaccharides" Available at http://polysac3db.cermav.cnrs.fr/discover_starch.html; Accessed Feb. 16, 2017, 10 pages.

Office Action for U.S. Appl. No. 14/853,780 dated Nov. 6, 2017.

Final Office Action for U.S. Appl. No. 14/853,725 dated Nov. 8, 2017.

U.S. Appl. No. 15/628,379, filed Jun. 20, 2017, LaPray.

PCT Search Report dated Sep. 14, 2016 for PCT/US2016/040092, 1 page.

PCT Search Report dated Sep. 15, 2016 for PCT/US2016/040104, 1 page.

Kalambur, et al., "An Overview of Starch-Based Plastic Blends from Reactive Extrusion" Journal of Plastic Film and Sheeting, 2006, vol. 22, pp. 39-58.

Wootthikanokkhan, et al., "Effect of Blending Conditions on Mechanical, Thermal, and Rheological Properties of Plasticized Poly(lactic acid)/Maleated Thermoplastic Starch Blends," Journal of Applied Polymer Science, 2012, vol. 124, pp. 1012-1019.

Tang, et al., "Recent Advances in Starch, Polyvinyl Alcohol Based Polymer Blends, Nanocomposites and their Biodegradability" Carbohydrate Polymers, 2011, vol. 85, pp. 7-16.

Turley "Coca-Cola Collaborates on Bio-PET Project" ChemistryWorld, Jun. 11, 2012, accessed Apr. 6, 2017 at https://www.chemistryworld.com/news/coca-cola-collaborates-on-bio-pet-project/5091.article, 2 pages.

Braskem "Life Cycle Assessment of Green Plastic" Available as early as Mar. 28, 2017, accessed at http://www.braskem.com_site.aspx_plastic-green, 18 pages.

De Guzman "Coca-Cola produces 100% Bio-Based PET Bottle" Green Chemicals Blog, Jun. 9, 2015, 3 pages, accessed on Mar. 28, 2017 at https://greenchemicalsblog.com/2015/06/09/coca-cola-produces-100-bio-based-pet-bottle/ 3 pages.

Ojeda, Telmo, et al., "Polymer Degradation and Stability" Available as early as Dec. 16, 2010 at www.elsevier.com/locat/polydegstab, 5 pages.

Thakore, I.M., et al., "Studies on Biodegradability, morphology and thermo-mechanical properties of LDPE/modified starch blends" published in *The European Polymer Journal*, vol. 37 2001, pp. 151-160.

Vargha, et al., "Behavior of Polyethylene Films in Soil" published in *Periodica Polytechnica Chemical Engineering*, Nov. 5, 2015 pp. 60-68.

Li, Gang, et al., "Biodegradation of Thermoplastic Starch and its Blends with Poly(lactic acid) and Polyethylene: Influence of Morphology" published in *Macromolecular Journals of Chemistry and Physics*, 2011 pp. 1147-1154.

U.S. Appl. No. 14/853,780, Oct. 12, 2016, Office Action.
U.S. Appl. No. 14/853,725, Apr. 28, 2017, Office Action.
U.S. Appl. No. 14/853,780, May 24, 2017, Final Office Action.

Ibbrucker, Constance "Can Additives make plastics biodegradable?" Bioplastics Magazine Jan. 2017, 1 page.

Ibbrucker, Constance "Oxo-degradable plastics increasingly under fire in Europe" European Bioplastics, http://www.european-bioplastics.org/oxo-degradable-plastics-increasingly-under-fire-in-europe/ Feb. 28, 2017, 5 pages.

"'Oxo-Biodegradable' Plastics and Other Plastics with Additives for Degradation" European Bioplastics BackGround Oct. 2015, 5 pages.

"BPI Position on Degradable Additives" Feb. 2010, 6 pages.

"The SPC Position Against Biodegradability Additives for Petroleum-Based Plastics" Sustainable Packaging Coalition, http://www.sustainablepackaging.org/content/?type=5&id=position-against-biodegradability-additives-for-petroleum-based-plastics Retreived on Sep. 19, 2017, 5 pages.

"APR Position Statement-Degradable Additives Use in Bottles, Forms and Films" The Association of Postconsumer Plastic Recyclers, http://plasticsrecycling.org/about/position-statements, Apr. 27, 2015, 1 page.

International Search Report and Written Opinion for PCT PCT/US2017/068492 dated Mar. 16, 2018, 14 pages.

Tokiwa, et al., "Biodegradability of Plastics" in the International Journal of Molecular Sciences, Aug. 26, 2009, vol. 10, pp. 3722-3742.

Arevalo-Nino et al., "Starch-based extruded plastic films and evaluation of their biodegradable properties" Biodegradation 7: 231-237, 1996.

Chen et al. "Environmental Degradation of Starch/Poly (Lactic Acid) Composite in Seawater" Apr. 6, 2010.

"Environmentally Degradable Plastics" Leonardo Da Vinci Program; Jan. 2000-Dec. 2006.

Esmaeili, Atefeh, et al. "Biodegradation of Low-Density Polyethylene (LDPE) by Mixed Culture of *Lysinibacillus xylanilyticus* and *Aspergillus niger* in Soil." *PLoS ONE* 8(9): e71720, Sep. 23, 2013. https://doi.org/10.1371/journal.pone.0071720. Accessed Apr. 16, 2018.

Gupta, Apeksha et al. "Visible Range Photocatalysts for Phase Photocatalytic Degradation of Polyethylene and Polyvinyl Chloride" *Journal of the Chilean Chemical Society*, [S.I.], v. 62, n. 1, Jun. 2017. ISSN 0717-9707. <https://jcchems.com/index.php/JCCHEMS/article/view/156>. Accessed: Apr. 20, 2018.

Luo, Ying, et al. "Accelerating the degradation of polyethylene composite mulches." Plastics Research Online, May 19, 2017. Society of Plastics Engineers (SPE), DOI: 10.2417/spepro.006909. Accessed Apr. 20, 2018.

Oluz, Zehra and Teoman Tinçer. "Additives for ultraviolet-induced oxidative degradation of low-density polyethylene." *J. Appl. Polym. Sci.*, 133, 43354, Jan. 18, 2016. Wiley Online Library, DOI: 10.1002/app.43354. Accessed Apr. 21, 2018.

Shang, Jing, et al. "Photocatalytic Degradation of Polystyrene Plastic under Fluorescent Light." *Environmental Science & Technology*, Sep. 5, 2003, 37 (19), pp. 4494-4499. American Chemical Society, DOI: 10.1021/es0209464. Accessed Apr. 20, 2018.

Shogren et al. "Biodegradation of starch/polylactic acid/poly(hydroxyester-ether) composite bars in soil" Polymer Degradation and Stability 79 (2003) 405-411.

Sumathi, Tirupati et al. "Production of Laccase by *Cochliobolus* sp. Isolated from Plastic Dumped Soils and Their Ability to Degrade Low Molecular Weight PVC." *Biochemistry Research International* 2016 (2016): 9519527. *PMC*. Web. Apr. 16, 2018.

Thryft, Ann R. "Biodegradable Plastics Standard to Bust Landfill Waste." ENSO Plastics, Nov. 15, 2011. http://ensoplastics.com/theblog/?p=535. Accessed Apr. 23, 2018.

"Transition Metal Salts." Oxo-biodegradable Plastics Association, http://www.biodeg.org/index.html. Accessed Apr. 20, 2018.

Zhang, et al. "Retrogradation and Antiplasticization of Thermoplastic Starch" Mar. 2012.

U.S. Appl. No. 15/628,379, Apr. 30, 2018, Office Action.
U.S. Appl. No. 15/481,823, Apr. 30, 2018, Office Action.
U.S. Appl. No. 15/481,806, Apr. 30, 2018, Office Action.
U.S. Appl. No. 15/691,588, Apr. 30, 2018, Office Action.
U.S. Appl. No. 16/287,884, filed Feb. 27, 2019, LaPray.

Bastioli et al. "Starch in Polymers Technology" ACS Symposium Series, Jan. 1, 2012, American Chemical Society/Oxford University Press, XP055490447, vol. 1114, pp. 87-112.

Cardia Bioplastics FAQ [online] [site accessed Oct. 23, 2018] URL: http://www.cardiabioplastics.com/our-business/faq.

Eyheraguibel, et al. "Characterization of oxidized oligomers from polyethylene films by mass spectrometry and NMR spectroscopy before and after biodegradation by a *Rhodococcus rhodochrous* strain" Chemosphere 184, 2017, pp. 366-374.

(56) References Cited

OTHER PUBLICATIONS

Fujisawa, et al. "Degradation of Polyethylene and Nylon 66 by the Laccase-Mediator System" Journal of Polymers and the Environment, vol. 9, Issue 3, 2001, pp. 103-108.
Ohtake, et al. "The Biodegradability of Polyethylene" Material Life, vol. 6, Issue 3, 1994, pp. 125-133.
PCT International Search Report and Written Opinion for PCT/US2018/026610 dated Jul. 13, 2018.
Tena-Salcido et al. "Effect of Morphology on the Biodegradation of Thermoplastic Starch in LDPE/TPS Blends" Polymer Bulletin, vol. 60, No. 5, Jan. 30, 2008, pp. 677-688.
Van Soest et al. "Crystallinity in Starch Plastics: Consequences for Material Properties" Trends in Biotechnology, vol. 15, No. 6, Jun. 1, 1997, pp. 208-213.
U.S. Appl. No. 14/853,780, Aug. 10, 2018, Office Action.
U.S. Appl. No. 15/628,379, Oct. 3, 2018, Notice of Allowance.
U.S. Appl. No. 15/481,806, Oct. 12, 2018, Office Action.
U.S. Appl. No. 15/481,823, Oct. 12, 2018, Office Action.
U.S. Appl. No. 14/853,725, Oct. 12, 2018, Office Action.
U.S. Appl. No. 15/481,806, Feb. 28, 2019, Office Action.
U.S. Appl. No. 15/481,823, Feb. 28, 2019, Office Action.
U.S. Appl. No. 14/853,780, Feb. 28, 2019, Office Action.
U.S. Appl. No. 16/391,909, filed Apr. 23, 2019, LaPray.
Pearce "Biodegradable plastic bags carry more ecological harm than good" The Guardian, Jun. 18, 2009.
"The Flexible Packaging Association Position on Degradable Additives" FPA, Jun. 21, 2010.
"French Proposal for Law on Biodegradable Plastics" Oxo-Biodegradable Plastics Association, Revised Oct. 31, 2013.
"Case Study: Compostable vs Oxo Degradable" Natur Bag, Feb. 19, 2019.
"Position Paper on Degradable Additives" SPI Bioplastics Division, issued Feb. 2016.
"Report from the Commission to the European Parliament and the Council on the Impact of the Use of Oxo-Degradable Plastic, Including Oxo-Degradable Plastic Carrier Bags, on the Environment" European Commission, Brussels, Jan. 16, 2018.
"What Are Oxo-biodegradable Additives" MJS Packaging, May 8, 2014.
"Background on Biodegradable Additives" BPI, Feb. 12, 2010.
Ahmed et al. "Biodegradation of plastics: current scenario and future prospects for environmental safety." Environmental Science and Pollution Research 25.8 7287-7298. p. 7 col. 1 paragraph 2; Table 1; and Figure 1.
U.S. Appl. No. 15/836,555, Aug. 12, 2019, Office Action.
Huagong et al., "Green Manufacturing Process of Fine Chemical Industry", 2006, Guangdong Science & Technology Press (National Outstanding Press).
Nayak, "Biodegradable PBAT/Starch Nanocomposites", Nov. 24, 2010, Polymer-Plastics Technology and Engineering, 49:14, pp. 1406-1418, accessed on Feb. 24, 2013.
Ren et al., "Preparation, characterization and properties of binary and ternary blends with thermoplastic starch, poly(lactic acid) and poly(butylene adipate-co-terephthalate)", 2009, Carbohydrate Polymers, vol. 77, pp. 576-582.
Santos, R. A. L. et al. "Starch/Poly 9 Butylene Adipate-Co Terephthlalate/Montmorillonite Films Produced by Blow Extrusion".
Schwach et al., "Starch-based biodegradable blends: morphology and interface properties", 2004, Polymer International, vol. 53, pp. 2115-2124, DOI: 10.1002/pi.1636.
Shirai et al., "Thermoplastic starch/polyester films: Effects of extrusion process and poly (lactic acid) addition", 2013, Materials Science and Engineering C, vol. 33, pp. 4112-4117.
U.S. Appl. No. 15/481,806, Nov. 6, 2019, Final Office Action.
U.S. Appl. No. 15/481,823, Jul. 12, 2019, Final Office Action.
U.S. Appl. No. 15/481,823, Dec. 9, 2019, Office Action.
U.S. Appl. No. 15/836,555, filed Feb. 7, 2020, Final Office Action.
U.S. Appl. No. 16/456,303, Apr. 9, 2020, Office Action.
U.S. Appl. No. 15/836,555, Jul. 14, 2020, Office Action.
U.S. Appl. No. 16/999,542, filed Aug. 21, 2020, LaPray.
U.S. Appl. No. 16/925,705, filed Jul. 10, 2020, LaPray.
U.S. Appl. No. 16/925,952, filed Jul. 10, 2020, LaPray.
U.S. Appl. No. 16/925,747, filed Jul. 10, 2020, LaPray.
U.S. Appl. No. 15/481,806, Jul. 29, 2020, Office Action.
U.S. Appl. No. 15/481,823, Jul. 20, 2020, Final Office Action.
U.S. Appl. No. 16/456,295, Jul. 22, 2020, Office Action.
U.S. Appl. No. 16/287,884, Jul. 30, 2020, Office Action.
Ruchuan et al., "Study on Starch-Polyethylene Film", Journal of Tianjin University, No. 2, 1990, pp. 23-29.
Non-Final Office Action received for U.S. Appl. No. 16/391,909, dated Dec. 1, 2020, 10 pages.
Notice of Allowance received for U.S. Appl. No. 15/481,806, dated Jan. 7, 2021, 11 pages.
Notice of Allowance received for U.S. Appl. No. 15/481,823, dated Dec. 9, 2020, 9 pages.
Notice of Allowance received for U.S. Appl. No. 15/481,823, dated Jan. 8, 2021, 2 pages.
Notice of Allowance received for U.S. Appl. No. 16/456,295, dated Dec. 15, 2020, 3 pages.
Notice of Allowance received for U.S. Appl. No. 16/456,295, dated Nov. 19, 2020, 11 pages.
"Environmentally Degradable Plastics," Leonardo Da Vinci Program, Contract Nol 1/98/2/05261 /PI/11.1.1.b/CONT, 202 pages. May 4, 1999.
"Biodegradation of starch-polyethylene films in soil and by microbial cultures", Nov. 1997, Dave, et al. World Journal of Microbiology and Technology, 13, 655-68., World Journal of Microbiology and Technology, 655-668, 13.
Arvanitoyannis et al., Biodegradable films made from low density polyethylene (LDPE), rice starch and potato starch for food packaging applications: Part 1, Carbohydrate Polymers, vol. 36, (1998), pp. 89-104.
Biodegradable Plastics Standard to Bust Landfill Waste, ENSO Plastic Blog, printed Feb. 20, 2019, 3 pages.
Campo, E. Alfredo, Polymeric Materials and Properties, Science Direct, 2018.
Cardia Biohybrid, Film Blowing/ Blow Moulding Resin, Sep. 8, 2017.
Cardia Bioplastics FAQ [online] [site accessed Oct. 23, 2020 18] URL: http://www.cardiabioplastics.com/our-business/faq.
Cardia Compostable B-F, Blown Film Resin, Biodegradable during Composting in Professionally Managed Facilities, CBP Technical Data Sheet, Nov. 3, 2017, 2 pages. 2019.
Chen et al., "Environmental Degradation of Starch/Poly(Lactic Acid) Composite in Seawater," Key and Open Laboratory of Marine and Estuarine Fisheries Ministry of Agriculture, East China Sea Fisheries Research Institute, Chinese Academy of Fishery Sciences, Polymers and Polymer Composites, vol. 19, No. 7, 2011, pp. 559-566.
Corn Starch/Fisher Scientific, 3 pages [online] [site accessed Sep. 18, 2020] url: https://www.fishersci.com/shop/products/corn-starch-2/S25580 (undated).
Droge et al., WO 2016/134994 Machine Translation, Sep. 1, 2016 (Year: 2016).
Emmanuel Schwach "Starch-based biodegradable blends: morphology and interface properties," Polymer International, 2004, pp. 2115-2124.
English Abstract of BY 21006 C1. Apr. 2017.
Final Office Action received for U.S. Appl. No. 15/836,555, dated Nov. 30, 2020, 27 pages.
Fine Chemical Engineering Green Production Process, I st edition, edited by Qihuang Song, Guangdong Science & Technology Press, published on Mar. 31, 2006, p. 174.
Gadhave et al., Starch Based Bio-Plastics: The Future of Sustainable Packaging, Open Journal of Polymer Chemistry, 2018, vol. 8, pp. 21-33.
International Search Report issued in PCT Application PCT/US2019/28733.
Meereboer et al., "Review of recent advances in the biodegradability of polyhydroxyalkanoate (PHA) bioplastics and their composites," Green Chem., vol. 22, 2020, pp. 5519-5558.
Ming et al, CN107793619 Machine Translation, Mar. 13, 2018 (Year: 2018).

(56) References Cited

OTHER PUBLICATIONS

Nguyen et al., "Biodegradability of polymer film based on low density polyethylene and cassava starch," International Biodeterioration & Biodegradation, vol. 115, 2016, pp. 257-265.
Notice of Allowance received for U.S. Appl. No. 16/456,303, dated Jul. 1, 2020.
Notice of Allowance received for U.S. Appl. No. 16/456,303, dated Jul. 28, 2020.
Office action for U.S. Appl. No. 14/853,725, dated Apr. 30, 2018, LaPray et al., "Articles Formed with Biodegradable Materials and Strength Characteristics of Same", 19 pages.
Office Action received for U.S. Appl. No. 16/391,909 , dated Dec. 1, 2020.
Ojeda, et al., "Degradability of linear polyolefins under natural weathering, Polymer Degradation and Stability," 2011, pp. 703-707.
Requirement for Restriction/Election received for U.S. Appl. No. 16/391,909, dated Sep. 8, 2020.
S.K. Nayak "Biodegradable PBAT/Starach Nanocomposites" Polymer-Plastics Technology and Engineering, 2010, pp. 1406-1418.
Sashiwa et al., "Microbial Degradation Behavior in Seawater of Polyester Blends Containing Poly(3-hydroxybutyrate-co-3-hydroxyhexanoate) (PHBHHx)," Mar. Drugs, vol. 16, 2018, 34, 11 pages.
Shahin, "In-situ Nano Fibrillation of Polyethylene Terephthalate (PET) in Polypropylene (PP) through Spunbond Process," Department of Mechanical and Industrial Engineering, 2019, 89 pages.
U.S. Appl. No. 15/481,823, filed Apr. 7, 2017, LaPray.
U.S. Application Filed on Apr. 7, 2017, by LaPray, U.S. Appl. No. 15/481,806.
Vargha et al., "Behavior of Polyethylene Films in Soil, Periodica Polytechnica Chemical Engineering," DOI: 10.3311/PPch. 8281, Creative Commons Attribution, 2016, pp. 60-68.
Yu et al., "Morphology and Mechanical Properties of Immiscible Polyethylene/Polyamide12 Blends Prepared by High Shear Processing," Chinese Journal of Polymer Science, 2017, 35(9):1132-1142.
Zhang et al., "Retrogradation and Antiplasticization of Thermoplastic Starch," Richardson Centre for Functional Foods and Nutraceuticals, University of Manitoba, www.intechopen.com, 19 pages. 2012.
Zhong et al., "Biodegradable polymers and green-based antimicrobial packaging materials: A mini-review," Advanced Industrial and Engineering Polymer Research, vol. 3, 2020, pp. 27-35.
Gilfillan, "Developing Starch-Based Polymer Composites", Doctor of Philosophy, 2015, pp. 1-128.
Machine translation of JP-2008013602-A (Year: 2008).

\* cited by examiner

US 11,046,840 B2

METHODS FOR LENDING BIODEGRADABILITY TO NON-BIODEGRADABLE PLASTIC MATERIALS

CROSS-REFERENCE TO RELATED APPLICATION

This application is a continuation in part of U.S. application Ser. No. 14/853,725 filed on Sep. 14, 2015 which claims the benefit of U.S. Provisional Patent Application No. 62/187,231 filed on Jun. 30, 2015. This application is also a continuation in part of U.S. application Ser. No. 14/853,780 filed on Sep. 14, 2015, and a continuation in part of U.S. application Ser. No. 15/481,806 (21132.1) and Ser. No. 15/481,823, both filed on Apr. 7, 2017. This application also claims the benefit of U.S. Provisional Patent Application No. 62/440,399 filed on Dec. 29, 2016, and U.S. Provisional Patent Application No. 62/442,432 filed on Jan. 4, 2017. The entire contents of each of the foregoing is incorporated by reference herein. U.S. Provisional Patent Application No. 62/483,109, filed Apr. 7, 2017 is also incorporated by reference herein, in its entirety.

BACKGROUND

Traditional petrochemical-based plastics are formulated to be strong, lightweight, and durable. However, these plastics are typically not biodegradable, and as a result, hundreds of millions of tons of plastic sits in landfills or floats in the ocean. In trying to reduce the amount of plastic waste, some articles typically produced using petrochemical-based plastics are being produced using biodegradable materials.

Petrochemical-based plastics materials, such as large quantities of polyethylene and polypropylene, as well as numerous other plastics (polyethylene terephalate, polyester, polystyrene, ABS, polyvinyl chloride, polycarbonate, nylon, and the like) are typically not readily biodegradable. Such is typically the case even for so called "green" plastics of such materials, which may be sourced from renewable or sustainable sources, rather than petro-chemical feedstocks.

While there have more recently been efforts to render such plastic materials increasingly degradable by addition of UV and/or OXO additives (e.g., such as PDQ-M, PDQ-H, BDA, and OxoTerra™ from Willow Ridge Plastics, OX1014 from LifeLine, or organic additives (e.g., such as Restore® by Enso, EcoPure® by Bio-Tec Environmental, ECM Masterbatch Pellets 1M by ECM Biofilms, or BioSphere®), use of such additives is generally frowned up by plastic industry associations (e.g., SPC, APR, FPA, and/or BPI), as the degree of biodegradability and the rate of biodegradation is often too slow, and the OXO additives usually simply initiate structural fragmentation or degradation that accelerates physical deterioration of such plastic materials into small pieces of the underlying base plastic material, rather than the desired actual conversion of the plastic back into natural materials such as carbon dioxide ($CO_2$), water ($H_2O$), and methane ($CH_4$).

For example, such materials simply act to accelerate break-up of the macro-structure of the plastic article itself due to exposure to UV light (from sun exposure) and/or exposure to oxygen. Such specialty plastics may not actually biodegrade to any appreciable degree within a given time frame (e.g., 5 years, 3, years, or 1 year), but simply lose strength, crack, and break up into small pieces. The result is a pile or small pieces of polyethylene or other base plastic material that results as the bottle, film, or other article physically degrades over time due to the addition of the UV and/or OXO additives, but the weight fraction of polyethylene or other base plastic material remains substantially the same, with no real biodegradation actually occurring. The degradation is merely physical, as the article becomes brittle, cracks, and breaks up into small pieces, leaving many small fragments of polyethylene or other base plastic material. Application of the term "biodegradable" to such plastic materials is something of a misnomer, as complete biodegradation of the polymer material itself may not actually be occurring (e.g., where substantial fractions of the plastic would be degraded into $CO_2$, $CH_4$, $H_2O$, and the like).

SUMMARY

This disclosure is directed to methods for lending biodegradability to plastic articles that are typically not otherwise biodegradable. The present applicant has surprisingly found that such non-biodegradable plastic materials can easily be rendered biodegradable by addition of a fraction of a carbohydrate-based polymeric material (such as Eco Starch Resin "ESR", available from applicant) which has surprisingly been found to lend biodegradability to such plastic materials when blended therewith.

For example, such a method may include providing a plastic material that is not itself biodegradable on its own, providing one or more carbohydrate-based polymeric materials, which materials are specifically selected for their ability to lend biodegradability to the plastic material that is not itself biodegradable on its own, and blending the carbohydrate-based polymeric material with the plastic material (e.g., by melting the two together, and forming an article from the melt blend.

Applicants have demonstrated the ability to lend biodegradability to several plastic materials that are not otherwise biodegradable, examples of such may include, but are not limited to polyethylene, polypropylene, other polyolefins, polyethylene terephalate, polyester, polystyrene, ABS, polyvinyl chloride, nylon, and polycarbonate.

Blends of such plastics with the carbohydrate-based biodegradability lending polymeric material may be mixed and heated (e.g., melted) for use in forming extruded plastic products, injection molded plastic products, blow molded plastic products, blown film plastic products, extruded or cast sheet or films, thermoformed plastic products, and the like.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

I. Definitions

Figure 1:
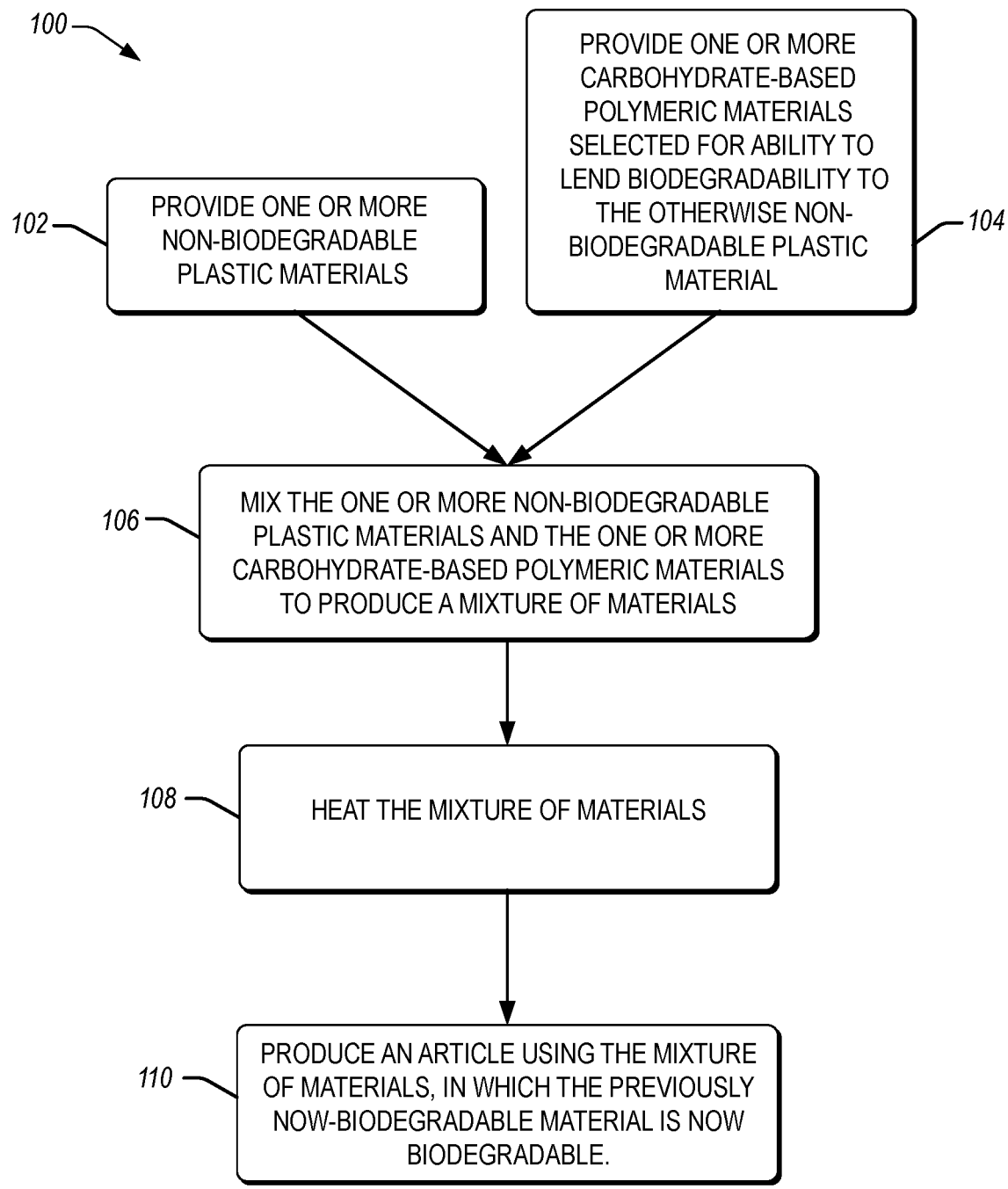
FIG. 1 illustrates a flow diagram of an example process of forming an article including biodegradable materials.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

The terms "a," "an," "the" and similar referents used in the context of describing the inventive features (especially in the context of the following claims) are to be construed to cover both the singular and the plural, unless otherwise indicated herein or clearly contradicted by context. Thus, for example, reference to a "starch" can include one, two or more starches.

"Film," as used herein, refers to a thin continuous article that includes one or more polymeric materials that can be used to separate areas or volumes, to hold items, to act as a barrier, and/or as a printable surface.

"Bag," as used herein, refers to a container made of a relatively thin, flexible film that can be used for containing and/or transporting goods.

"Bottle," as used herein, refers to a container that can be made from the presently disclosed plastics, typically of a thickness greater than a film, and which typically includes a relatively narrow neck adjacent an opening. Such bottles may be used to hold a wide variety of products (e.g., beverages, personal care products such as shampoo, conditioner, lotion, soap, cleaners, and the like).

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 25%, 15%, 10%, within 5%, within 1%, etc. of a stated value. Furthermore, the terms "substantially", "similarly", "about" or "approximately" as used herein represent an amount or state close to the stated amount or state that still performs a desired function or achieves a desired result. For example, the term "substantially" "about" or "approximately" may refer to an amount that is within 25% of, within 15% of, within 10% of, within 5% of, or within 1% of, a stated amount or value.

Some ranges are disclosed herein. Additional ranges may be defined between any values disclosed herein as being exemplary of a particular parameter. All such ranges are contemplated and within the scope of the present disclosure. Further, recitation of ranges of values herein is intended to serve as a shorthand method of referring individually to each separate value falling within the range. Unless otherwise indicated herein, each individual value is incorporated into the specification as if it were individually recited herein.

All numbers expressing quantities of ingredients, constituents, conditions, and so forth used in the specification and claims are to be understood as being modified in all instances by the term "about". Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The phrase 'free of' or similar phrases as used herein means that the composition comprises 0% of the stated component, that is, the component has not been intentionally added to the composition. However, it will be appreciated that such components may incidentally form under appropriate circumstances, may be incidentally present within another included component, e.g., as an incidental contaminant, or the like.

The phrase 'substantially free of' or similar phrases as used herein means that the composition preferably comprises 0% of the stated component, although it will be appreciated that very small concentrations may possibly be present, e.g., through incidental formation, incidental contamination, or even by intentional addition. Such components may be present, if at all, in amounts of less than 1%, less than 0.5%, less than 0.25%, less than 0.1%, less than 0.05%, less than 0.01%, less than 0.005%, or less than 0.001%.

II. Introduction

The present disclosure is directed to, among other things, methods for lending biodegradability to a plastic material that itself is not otherwise biodegradable by blending such plastic material with a carbohydrate-based (e.g., starch-based) polymeric material that is specifically selected for its ability to lend biodegradability to the plastic material that is not itself biodegradable on its own. Such methods are particularly beneficial in that they allow numerous plastic items that are thrown out to be readily biodegraded in a landfill or similar environment, rather than continuing to exist in their polymeric, stable state, indefinitely.

Furthermore, Applicant has observed that biodegradation of such articles does not readily occur where the articles are stored in typical storage and use environments (e.g., stored in a home, office, warehouse, or the like), but that biodegradation generally only begins to occur where the article is placed in an environment that simulates or is that of a landfill or compost or other typical disposal conditions. For example, such conditions often include (i) a temperature that is somewhat elevated above normal ambient "use" or "storage" temperatures, (ii) exposure to elevated moisture levels, and (iii) exposure to particular classes of microbes indigent to landfills or compost and similar disposal environments. Elevated temperature and moisture will not cause degradation of such articles unless the necessary microorganisms are also present. The combination of such conditions causes the articles formed from such a blend of materials to begin to biodegrade. Third party testing as described herein confirms that not only is the carbohydrate-based polymeric material biodegrading, but that the plastic material which is otherwise not biodegradable is actually also biodegrading, as well.

While the mechanisms by which such biodegradation becomes possible upon blending with the carbohydrate-based polymeric material may not be completely understood, it is believed that blending the two plastic materials together, coupled with perhaps particular characteristics of the carbohydrate-based polymeric material somehow breaks the hygroscopic barrier associated with the non-biodegradable plastic materials, allowing the microbes that would biodegrade the carbohydrate-based polymeric material to not only biodegrade the carbohydrate-based polymeric material, but to also biodegrade the adjacent plastic molecules as well. The carbon bonds are being broken and the biodegradation is confirmed based on third party tests that capture and measure the carbon dioxide and methane that is off-gassed. Such results are surprising, unexpected, and particularly advantageous.

Articles can be produced by mixing the carbohydrate-based polymeric material with the non-biodegradable plastic material, heating the mixture, and molding (e.g., injection molding) the mixture, extruding the mixture, blow molding the mixture, blow-forming the mixture (e.g., forming a blown film), thermoforming the mixture, or the like. Various other plastic manufacturing processes will be apparent to those of skill in the art in light of the present disclosure.

The articles described herein can be produced in the form of any conceivable structure, including, but not limited to bottles, boxes, other containers, sheets, films, bags, and the like. Thin films for bags and film wraps (e.g., for wrapping around or over a product) can easily be made using blown film equipment.

Examples of suitable carbohydrate-based or starch-based polymeric materials that have been shown to lend biodegradability to otherwise non-biodegradable plastic materials for use in forming such articles are available from BiologiQ, under the tradename ESR ("Eco Starch Resin"). Specific examples include, but are not limited to GS-270, GS-300, and GS-330. Specific characteristics of such ESR materials will be described in further detail herein. Other carbohydrate-based or starch-based polymeric materials may also be suitable for use so long as they are capable of, and specifically selected for the purpose of lending biodegradability to plastic materials that are otherwise not biodegradable.

III. Exemplary Articles and Methods

FIG. 1 illustrates an exemplary process 100 that may be used to lend biodegradability to a plastic material that itself is not otherwise biodegradable. At 102, the process 100 can include providing one or more non-biodegradable plastic (e.g., polymeric) materials (e.g., including, but not limited to polyethylene, polypropylene, other polyolefins, polyethylene terephalate, polyester, polystyrene, ABS, polyvinyl chloride, nylon, or polycarbonate). At 104, the process 100 can include providing one or more carbohydrate-based polymeric materials, at least one of which is specifically selected for inclusion in the blend for its recognized ability to lend biodegradability to the otherwise non-biodegradable plastic material provided at 102. The one or more carbohydrate-based polymeric materials can include starch-based polymeric materials. The carbohydrate-based polymeric materials and the otherwise non-biodegradable plastic materials can be provided in a desired form, such as pellets, powders, nurdles, slurry, and/or liquids. In specific embodiments, the materials can be in the form of pellets. The method further includes blending the plastic material with the carbohydrate-based polymeric material.

Such simple blending has surprisingly been observed by Applicant to render the plastic material biodegradable, where such material did not previously exhibit such a characteristic. As a result, the blend of such materials is fully biodegradable, and articles formed from such a blend are similarly biodegradable. By way of example, although polyethylene itself is not biodegradable, Applicant has discovered that blending polyethylene with the carbohydrate-based polymeric materials having characteristics as described herein lends biodegradability to the polyethylene, so that not only does the carbohydrate-based polymeric material biodegrade, but the polyethylene blended therewith also becomes biodegradable as a result of its blending with the carbohydrate-based polymeric material.

Such blends may be formed in manufacture into a desired article through any conceivable process. An example of such would be an extrusion process. For example, the non-biodegradable plastic material and the carbohydrate-based polymeric material selected for its ability to lend biodegradability can be feed into an extruder (e.g., into one or more hoppers thereof). The different materials can be fed into the extruder into the same chamber, into different chambers, at approximately the same time (e.g., through the same hopper), or at different times (e.g., through different hoppers, one being introduced into the extruder earlier on along the screw than the other), etc. It will be apparent that many numerous possibilities are possible.

In some cases, the non-biodegradable plastic material can include a polyolefin. For example, such plastic materials may include, but are not limited to polyethylene polypropylene polyethylene terephthalate, other polyolefins, polyester, polystyrene, ABS, polyvinyl chloride, nylon, polycarbonates, and the like. Such plastic material may be sourced from petrochemical sources, or from so-called "green" or sustainable sources (e.g., "green" PE, bioPET, and the like).

The carbohydrate-based polymeric materials can be formed from a plurality of materials (e.g., a mixture) including one or more starches. For example, the one or more starches can be produced from one or more plants, such as corn starch, tapioca starch, cassava starch, wheat starch, potato starch, rice starch, sorghum starch, and the like. In some embodiments, a mixture of different types of starches may be used, which Applicant has found to result in a synergistic increase in strength. A plasticizer is also present within the mixture of components from which the carbohydrate-based polymeric materials are formed. Water may also be used in forming the carbohydrate-based polymeric material, although only a small to negligible amount of water is present in the finished carbohydrate-based polymeric material.

The one or more carbohydrate-based polymeric materials can be formed from mostly starch. For example, at least 65%, at least 70%, at least 75%, or at least 80% by weight of the carbohydrate-based polymeric material may be attributable to the one or more starches. In an embodiment, from 65% to 90% by weight of the finished carbohydrate-based polymeric material may be attributed to the one or more starches. Other than negligible water content, the balance of the finished carbohydrate-based polymeric material may be attributed to the plasticizer (e.g., glycerin). The percentages above may represent starch percentage relative to the starting materials from which the carbohydrate-based polymeric material is formed, or that fraction of the finished carbohydrate-based polymeric material that is derived from or attributable to the plasticizer (e.g., at least 65% of the carbohydrate based polymeric material may be attributed to (formed from) the starch(es) as a starting material). Although some water may be used in forming the carbohydrate-based polymeric material, substantially the balance of the carbohydrate-based polymeric material may be attributed to glycerin, or another plasticizer. Very little residual water (e.g., less than 2%, typically no more than about 1%) may be present in the finished carbohydrate-based polymeric material.

For example, the materials from which the one or more carbohydrate-based polymeric materials are formed can include at least 12%, at least 15%, at least 18%, at least 20%, at least 22%, no greater than 35%, no greater than 32%, no greater than 30%, no greater than 28%, or no greater than 25% by weight of a plasticizer. Such percentages may represent that fraction of the finished carbohydrate-based polymeric material that is derived from or attributable to the plasticizer (e.g., at least 12% of the carbohydrate based polymeric material may be attributed to (formed from) the plasticizer as a starting material).

Exemplary plasticizers include, but are not limited to glycerin, polyethylene glycol, sorbitol, polyhydric alcohol plasticizers, hydrogen bond forming organic compounds which do not have a hydroxyl group, anhydrides of sugar alcohols, animal proteins, vegetable proteins, aliphatic acids, phthalate esters, dimethyl and diethylsuccinate and related esters, glycerol triacetate, glycerol mono and diacetates, glycerol mono, di, and tripropionates, butanoates, tearates, lactic acid esters, citric acid esters, adipic acid esters, stearic acid esters, oleic acid esters, other acid esters, or combinations thereof. Glyerin may be preferred.

The finished carbohydrate-based polymeric material may include no greater than 5%, no greater than 4%, no greater than 3%, no greater than 2%, no greater than 1.5%, no greater than 1.4%, no greater than 1.3%, no greater than 1.2%, no greater than 1.1%, or no greater than 1% by weight water. The ESR materials available from BiologiQ are examples of such finished carbohydrate-based polymeric materials, although it will be appreciated that other materials available elsewhere (e.g., at some future time) may also be suitable for use.

In some embodiments, mixtures of different starches may be used in forming the carbohydrate-based polymeric material. Use of such a mixture of different starches (e.g., coming from different plants) has been found to surprisingly be associated with a synergistic increase in strength in articles including such carbohydrate-based polymeric materials. In such a mixture of starches, a starch can be present in the mixture in an amount of at least 1%, at least 2%, at least 3%, at least 4%, at least 5%, at least 10%, at least 15%, at least 20%, at least 25%, at least 30%, at least 35%, at least 40%, no greater than 95%, no greater than 90%, no greater than 85%, no greater than 80%, no greater than 75%, no greater than 70%, no greater than 65%, no greater than 60%, no greater than 55%, no greater than 50%, or from 10% to 50% by weight relative to the combined weight of the plurality of starches. Some non-limiting exemplary mixtures may include 90% of a first starch, and 10% of a second starch, or 30% of a first starch and 70% of a second starch, or 50% of a first starch and 50% of a second starch. Mixtures of more than two starches (e.g., using 3 or 4 different starches) can also be used.

Examples of suitable carbohydrate-based (e.g., starch-based) polymeric materials for use in forming films and other articles are available from BiologiQ, located in Idaho Falls, Id., under the tradename ESR ("Eco Starch Resin"). Specific examples include, but are not limited to GS-270, GS-300, and GS-330. Additional details relative to fractions of starch and glycerin or other plasticizers used in forming ESR are described in Applicant's other patent applications, already incorporated herein by reference. ESR may be provided in pellet form. Physical characteristics for GS-270 and GS-300 are shown in Table 1 below.

TABLE 1

| PROPERTY | TEST METHOD | GS-270 NOMINAL VALUE | GS-300 NOMINAL VALUE |
| --- | --- | --- | --- |
| Density | ASTM D-792 | 1.40 g/cm$^3$ | 1.42 g/cm$^3$ |
| THERMAL PROPERTIES | | | |
| Melt Flow Index 200° C./5 kg | ASTM D-1238 | 1.98 g/10 min | 1.95 g/10 min |

TABLE 1-continued

| PROPERTY | TEST METHOD | GS-270 NOMINAL VALUE | GS-300 NOMINAL VALUE |
|---|---|---|---|
| Melting Temp. Range | ASTM D-3418 | 166-180° C. | 166-180° C. |
| Glass Transition Temp. | ASTM D-3418 | 81-100° C. | 81-100° C. |
| MECHANICAL PROPERTIES | | | |
| Tensile Strength @ Yield | ASTM D-638 | >30 MPa | >14 MPa |
| Tensile Strength @ Break | ASTM D-638 | >30 MPa | >14 MPa |
| Young's Modulus | ASTM D-638 | 1.5 GPa | 1.5 GPa |
| Elongation at Break | ASTM D-638 | <10% | <10% |
| Impact Resistance (Dart) | ASTM D-5628 | 3.5 kg | 4.5 kg |
| ADDITIONAL PROPERTIES | | | |
| Water Content | ASTM D-6980 | ≤1.5%, or ≤1% | ≤1.5%, or ≤1% |

The above characteristics shown for GS-270 and GS-300 are exemplary of other ESR products available from BiologiQ, although values may vary somewhat. For example, ESR products from BiologiQ may generally have a glass transition temperature ranging from about 70° C. to about 100° C. Those of skill in the art will appreciate that glass transition temperature can be indicative of degree of crystallinity. Values for melting temperature range, density, Young's Modulus, and water content may be identical or similar to those shown above in Table 1. Some characteristics may similarly vary somewhat (e.g., ±25%, or ±10%) from values shown for GS-270 and GS-300. ESR has an amorphous structure (e.g., more amorphous than typical raw starch). For example, typical raw starch powder has a mostly crystalline structure (e.g., greater than 50%), while ESR has a mostly amorphous structure (e.g., less than 10% crystalline).

ESR has a low water content, as described. As ESR absorbs moisture, it exhibits plastic behavior and becomes flexible. When removed from a humid environment, the material dries out and becomes stiff again (e.g., again exhibiting less than about 1% water content). The moisture present in ESR (e.g., in pellet form) may be released in the form of steam during processing such as that shown in FIG. 1. As a result, films or other articles produced from a starch-based polymeric material such as ESR blended with a non-biodegradable plastic material may exhibit even lower water content, as the non-biodegradable plastic material typically will include no or negligible water, and the water in the ESR may typically be released during manufacture of a desired article.

Low water content in the carbohydrate-based polymeric material can be important, as significant water content can result in incompatibility with the non-biodegradable plastic material, particularly if the article requires formation of a thin film. For example, as the water vaporizes, this can result in voids within the film or other article, as well as other problems. When blowing a thin film, the carbohydrate-based polymeric material used may preferably include no more than about 1% water.

Low water content is not achieved in the ESR material through esterification, as is common in some conventional TPS materials that may include relatively low water content. Such esterification can be expensive and complex to perform. Furthermore, the ESR materials that are exemplary of the carbohydrate-based polymeric materials employable herein also typically do not themselves actually include any identifiable starch, or identifiable glycerin, as such, as the starting materials of the ESR or other carbohydrate-based polymeric material have been chemically reacted and/or altered. X-ray diffraction patterns of exemplary carbohydrate-based polymeric materials as described below (e.g., and shown in FIG. 3) evidence such chemical alteration, showing that the finished polymeric material may be substantially devoid of starch in such identifiable, native form. In other words, the carbohydrate-based polymeric material is not simply recognized as a mixture including starch and glycerin. The low water content achievable in the carbohydrate-based polymeric material is believed to be due at least in part to the chemical alteration of the starch and plasticizer materials into a thermoplastic polymer, which does not retain water as would native starch, or conventional thermoplastic starches.

Returning to FIG. 1, processing at relatively high temperatures may result in some release of volatized glycerin (e.g., visible as smoke). If needed (e.g., where stored pellets may have absorbed additional water), drying of pellets can be performed by simply introducing warm dry air, e.g., at 60° C. for 1-4 hours, which is sufficient to drive off any absorbed water. Pellets should be dried to less than about 1% moisture content prior to processing, particularly if forming a film. ESR pellets may simply be stored in a sealed container with a desiccant in a dry location, away from heat to minimize water absorption, and to prevent undesired degradation.

In addition to ESR being thermoplastic, the ESR may also be thixotropic, meaning that the material is solid at ambient temperature, but flows as a liquid when heat, pressure and/or frictional movement are applied. Advantageously, pellets of ESR can be used the same as petrochemical based pellets (any typical non-biodegradable plastic resin pellets) in standard plastic production processes. ESR materials and products made therefrom may exhibit gas barrier characteristics. Products (e.g., films) made using such ESR pellets exhibit oxygen gas barrier characteristics (e.g., see Examples of Applicant's previous filings, already incorporated by reference). ESR materials may be non-toxic and edible, made using raw materials that are all edible. ESR and products made therefrom may be water resistant, but water soluble. For example, ESR may resist swelling under moist heated conditions to the point that pellets (e.g. with a size of 3-4 mm) thereof may not completely dissolve in boiling water within 5 minutes, but a pellet will dissolve in the mouth within about 10 minutes. ESR may be stable, in that it may not exhibit any significant retrogradation, even if left in relatively high humidity conditions, which characteristic differs from many other thermoplastic starch materials. Of course, products made with ESR may also exhibit such characteristics. If ESR is stored in humid conditions, the excess absorbed water can simply be evaporated away, and once the water content is no more than about 1%, it can be used in forming a film or other article.

The ESR material also does not typically undergo biodegradation under typical storage conditions, even in relatively humid conditions, as the other conditions typical of a landfill, compost or similar disposal environment containing the particular needed microorganisms are not present. Of course, where such conditions are present, not only does the ESR biodegrade, but otherwise non-biodegradable plastic materials blended therewith surprisingly also biodegrade. Evidence of such surprising results is included in the Examples section, included herein.

ESR can be cost competitive, being manufactured at a cost that is competitive with traditional polyethylene plastic resins. ESR can be mixed with other polymers, including, but not limited to PE, PP, PET, polyester, polystyrene, acrylonitrile butadiene styrene (ABS), polyvinyl chloride, nylon, and others. While the above non-biodegradable polymers can be rendered biodegradable by blending with ESR, it will be appreciated that ESR can also be blended with polymers that already are biodegradable and/or compostable, such as polylactic acid (PLA), poly(butylene adipate-co-terephthalate) (PBAT), polybutylene succinate (PBS), polycaprolactone (PCL), polyhydroxyalkanoates (PHA), other so-called thermoplastic starches, as well as various others. PBS, PCL, and PHA are polyesters. EcoFLEX™ is another example of a plastic material with which the ESR carbohydrate-based polymeric material may be blended. For example, the present methods are not limited to blending the carbohydrate-based polymeric material (e.g., ESR) with only a non-biodegradable plastic material, as it will be appreciated that biodegradable plastics (other than ESR) can also be incorporated into the blend, if desired.

By way of further explanation, PLA is compostable, meaning that it can degrade under elevated temperature conditions (i.e., composting conditions), but is technically not "biodegradable". Some of the above listed materials, such as PBS, PCL, and PHA may be both biodegradable and compostable. EcoFLEX™ is certified as compostable. FTC Green guidelines stipulate that a plastic cannot make an unqualified claim that it is "degradable" unless it will degrade within a "reasonably short period of time" (most recently defined as within 5 years) "after customary disposal".

In some embodiments, the ESR could be provided in a masterbatch formulation that may include the carbohydrate-based polymeric material as described above, and an amount of one or more compatibilizers. The masterbatch may also include one or more non-biodegradable plastic materials. Such masterbatch formulation pellets could be mixed with pellets of the non-biodegradable plastic material at the time of processing. Any conceivable ratios may be used in mixing such different pellets, depending on the desired percentage of ESR and/or compatibilizer and/or conventional non-biodegradable plastic material in the finished article.

ESR includes very low water content. For example, although raw starch (e.g., used in forming ESR) may typically include about 13% water by weight, the finished ESR pellets available from BiologiQ include less than about 1% water. ESR materials are biodegradable, and as described herein, not only is the starch-based ESR material biodegradable, but when blended with other polymers, such as non-biodegradable PE, PP, PET, polyester, polystyrene, ABS, polyvinyl chloride, nylon, and other non-biodegradable plastic materials, the blended material becomes substantially entirely biodegradable. Such results are quite surprising, and particularly advantageous. The Examples herein provide evidence of such surprising results. Typical thermoplastic starch materials do not claim to or exhibit such characteristics when blended with other plastic materials.

The ESR materials described as suitable for use herein as the carbohydrate-based (e.g., starch-based) polymeric material are substantially amorphous. For example, raw starch powder (e.g., such as is used in making ESR and various other thermoplastic starch materials) has approximately a 50% crystalline structure. ESR materials available from BiologiQ differ from many other commercially available thermoplastic starch (TPS) materials in crystallinity versus amorphous characteristics. For example, p. 62-63 of "Thermoplastic Starch Composites and Blends" a PhD thesis by Kris Frost (September 2010) states "[o]f particular interest in TPS is completeness of gelatinisation during processing, and any subsequent tendency toward retrogradation to form V-type amylose crystals". Frost further continues "[g]elatinisation involves loss of granular and crystalline structures by heating with water and often including other plasticizers or modifying polymers. Retrogradation is due to the re-coiling of amylose helical coils. Starch molecules disrupted during gelatinisation slowly re-coil into their native helical arrangements or new single helical conformations known as V type, causing TPS films to rapidly become brittle and lose optical clarity". Thus, conventional TPS tends to re-form a crystalline structure after the gelatinization process used to produce the TPS from raw starch. On the contrary, the ESR material available from BiologiQ does not revert back to a mostly crystalline structure. In addition, it can maintain a stable, relatively high degree of optical clarity, so as to be useful in forming relatively optically clear films (e.g., particularly by sandwiching ESR containing layers between polyethylene or other polyolefin layers).

Figure 3:
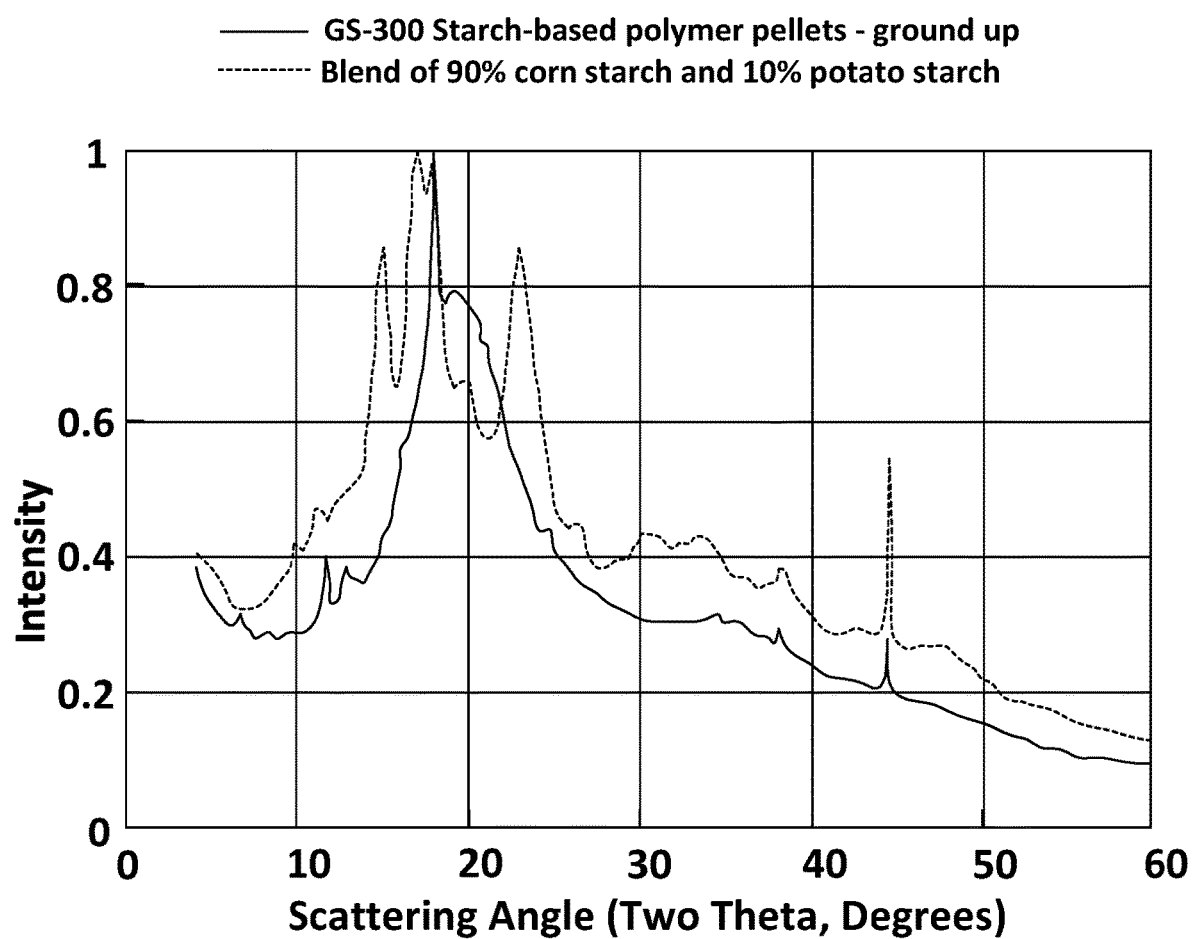
FIG. 3 shows X-ray diffraction patterns for an exemplary "ESR" carbohydrate-based polymeric material commercially available from BiologiQ as compared to that of the blend of native corn starch and native potato starch used to form the ESR.

In contrast to typical TPS materials, the ESR materials that are suitable examples of starch-based polymeric materials for use in forming articles described in the present application have an amorphous microstructure, and physical characteristics as shown in Table 1. The difference in the molecular structure between conventional TPS and ESR materials is evidenced by the ESR materials as described herein being much less crystalline than conventional thermoplastic starch-based materials as shown by X-ray diffraction, shown in FIG. 3, comparing diffraction pattern results for ESR material available from BiologiQ (sample 1) as compared to a blend of native raw corn starch and native raw potato starch, from which the ESR in FIG. 3 was formed. The diffraction pattern of the ESR as seen in FIG. 3 is much less crystalline (e.g., crystallinity of less than about 10%) than that of the native starch blend (crystallinity of about 50%). The difference in diffraction pattern evidences that a substantial chemical change has occurred in the material, due to processing from the native starches into ESR. For example, while there is a prominent diffraction peak between 20-25° with the native starch, no such peak is exhibited in the ESR. The native starch further shows a strong peak at about 45° (at an intensity of 0.5 to 0.6), which peak is greatly reduced in the ESR (only of about 0.25 to 0.3). Across nearly the entire spectrum, the diffraction intensities are higher for the native starches than for the ESR, with the exception of from about 18° to about 22°, as shown. The elevated diffraction intensity seen across a wide spectrum is indicative of greater crystallinity of the native starches as compared to the ESR. Numerous other differences also exist, as shown.

By way of example, the carbohydrate-based (e.g., starch-based) polymeric material used in making films according to the present disclosure may have a crystallinity of less than about 40%, less than about 35%, less than about 30%, less than about 25%, less than about 20%, less than about 15%, less than about 10%, less than about 8%, less than about 6%, less than about 5%, or less than about 3%. Any suitable test mechanism for determining crystallinity may be used, e.g., including but not limited to FTIR analysis, X-ray diffraction methods, and symmetrical reflection and transmission techniques. Various suitable test methods will be apparent to those of skill in the art.

In addition to the differences in the microstructure of the finished ESR as compared to the starting materials, films, bottles, sheets, disposable utensils, plates, cups, or other articles produced from a blend including the carbohydrate-based polymeric material are different from articles that are otherwise similar, but formed using conventional TPS and starch powder, or non-biodegradable plastic materials alone. For example, articles formed by blending the carbohydrate-based polymeric materials such as ESR as described herein with a non-biodegradable plastic material do not have "sea-island" features that are common when blending conventional TPS materials with polymeric materials such as polyethylene. Properties of the different films can be seen by comparing the physical properties of films as shown in Table 11 of Example 5 of Applicant's U.S. patent application Ser. No. 15/481,806, already incorporated by reference. In particular, this table compares the physical properties of films made by blending carbohydrate-based polymeric materials as contemplated herein with non-biodegradable polyethylene versus a conventional TPS blended with PE (Cardia BL-F). In addition to the differences in properties seen in Table 11 of Example 5 of Applicant's U.S. patent application Ser. No. 15/481,806, the film based on conventional TPS materials such as Cardia BL-F, blended with PE is not biodegradable, and not compostable.

As described herein, blending of the carbohydrate-based polymeric materials as described herein with a non-biodegradable plastic material results in not just the carbohydrate-based material being biodegradable, but the non-biodegradable plastic material actually becomes biodegradable (even where the non-biodegradable plastic material alone is not biodegradable). Such results do not occur when blending with typical TPS materials. Such differences in biodegradability clearly illustrate that there are significant structural and/or chemical differences in the resulting films and other articles, as the entire composite structure (i.e., the film or other structure) is now capable of being biodegraded, as shown by the various examples below.

Without being bound to any particular theory, it is believed that the carbohydrate-based polymeric resins may reduce the crystallinity of the blended products, interrupting the crystallinity and/or hygoscopic barrier characteristics of the polyethylene or other non-biodegradable plastic material in a way that allows water and bacteria to degrade the arrangements and linkages of otherwise non-biodegradable plastic molecules of the blend along with the carbohydrate-based polymeric resin material. In other words, the long polymer chains of polyethylene or other non-biodegradable plastic material are more easily broken by chemical and mechanical forces that exist in environments that are rich in bacteria and microorganisms, when blended with carbohydrate-based polymeric materials as contemplated herein. Subsequently, the microorganisms that exist naturally in a disposal environment (e.g., in a landfill) can consume the remaining smaller molecules so that they are converted back into natural components (such as $CO_2$, $CH_4$, and $H_2O$).

For example, truly biodegradable plastics decompose into natural elements or compounds such as carbon dioxide, methane, water, inorganic compounds, or biomass via microbial assimilation (e.g., the enzymatic action of microorganisms on the plastic molecules). Biodegradation of plastics can be enabled by first breaking down the polymer chains via either chemical or mechanical action but may only be fully accomplished through decomposition of the molecules by microbial assimilation.

Plastics made from petrochemical feedstocks or derived from plant sources begin life as monomers (e.g., single small molecules that can react chemically with other small molecules). When monomers are joined together, they become polymers ("many parts"), known as plastics. Before being joined together, many monomers are readily biodegradable, although after being linked together through polymerization, the molecules become so large and joined in such arrangements and linkages that microbial assimilation by microorganisms is not practical within any reasonable time frame.

Polymers are formed with both crystalline (regularly packed) structures and amorphous (randomly arranged) structures. Many polymers contain a high degree of crystallinity with some amorphous regions randomly arranged and entangled throughout the polymeric structure.

ESR materials available from BiologiQ are formed from starting starch materials which are highly crystalline, but in which the finished ESR plastic resin material exhibits low crystallinity (substantially amorphous). Such starch-based polymer materials are used as a starting material in the production of articles as described herein. ESR is, therefore, plastic that is made from starch. Because of its natural, starch-based origin and carefully controlled linkage types, the molecules (size and links) of plastic made with ESR are highly susceptible to biodegradation by enzymatic reactions caused from the introduction of humidity (water) and bacteria or other microorganisms, as evidenced by the experimental test results included herein.

Polyolefins such as rigid forms of polyethylene and polypropylene have a high degree of crystallinity and are made by converting monomer molecules (whether petroleum derived or derived from ethanol or other small building block molecules derived from plant sources) into long chain polymers. The bonds created when connecting the monomers to form long polymer chains are strong and difficult to break. Films and other articles formed from such polymeric materials are not biodegradable. Even if a given article were formed from a blend of conventional non-biodegradable plastic material and conventional TPS, it would not normally suddenly acquire biodegradability characteristics (other than the starch portion of the blend which may sometimes biodegrade).

Applicant has developed a process for lending biodegradability to an otherwise non-biodegradable plastic material by blending such plastic material with the carbohydrate-based polymeric materials having low crystallinity (e.g., ESR). Typically the non-biodegradable plastic material has higher crystallinity (e.g., particularly in the case of PE or PP).

In addition to biodegradability, the resulting blend may often have a higher elastic modulus (stiffness, or strength) than polyethylene or other non-biodegradable plastic material, and can be used to make plastic films or other articles that are stronger than the same articles made with pure polyethylene or other pure non-biodegradable plastic material. Such increased strength characteristics are described in U.S. patent application Nos. 14/853,725 and 15/481,806, already incorporated herein.

Returning to FIG. 1, at 106, the process 100 includes mixing the one or more non-biodegradable plastic materials and the one or more carbohydrate-based polymeric materials to produce a mixture of materials. In some cases, the mixing of the one or more non-biodegradable plastic materials and the one or more carbohydrate-based materials can be performed using one or more mixing devices. In a particular implementation, a mechanical mixing device can be used to mix the one or more non-biodegradable plastic materials and the one or more carbohydrate-based polymeric materials. In an implementation, at least a portion of the components of the mixture of the materials can be combined in an apparatus, such as an extruder, an injection molding machine, or the like. In other implementations, at least a portion of the components of the mixture of the materials can be combined before being fed into the apparatus.

The one or more carbohydrate-based polymeric materials can be present in the mixture of materials an amount sufficient to lend biodegradability to the particular non-biodegradable plastic material that the carbohydrate-based polymeric material is blended with. Such threshold level of the carbohydrate-based polymeric material may depend on the material it is being blended with. By way of example, the carbohydrate-based polymeric material may be included in an amount of at least 0.5%, at least 1%, at least 2%, at least 3%, at least 4%, at least 5%, at least 10%, at least 15%, at least 20%, at least 25%, at least 30%, at least 35%, at least 40%, at least 45%, no greater than 99%, no greater than 95%, no greater than 90%, no greater than 80%, no greater than 70%, no greater than 60%, no greater than 50%, from 2% to 98%, from 20% to 40%, from 10% to 40%, from 20% to 30%, from 50% to 80%, or from 40% to 60% by weight of the mixture of materials. More than one carbohydrate-based polymeric material, and/or more than one other plastic material may be included in the blend, if desired.

The non-biodegradable plastic material can be present in the mixture of materials in an amount of at least 0.5%, at least 1%, at least 2%, at least 3%, at least 4%, at least 5%, at least 10%, at least 15%, at least 20%, at least 25%, at least 30%, at least 35%, at least 40%, at least 45%, at least 50%, no greater than 99%, no greater than 95%, no greater than 90%, no greater than 85%, no greater than 80%, no greater than 75%, no greater than 70%, no greater than 65%, or no greater than 60%, from 2% to 98%, from 50% to 90%, from 65% to 75%, from 20% to 50% , or from 40% to 60% by weight of the mixture of materials.

A compatibilizer may be present in the mixture of materials. The compatibilizer can be mixed with the non-biodegradable plastic material, the carbohydrate-based polymeric material, mixed with both, or provided separately. Often the compatibilizer may be provided with at least one of the polymeric materials, e.g., included in a masterbatch formulation. The compatibilizer can be a modified polyolefin or other modified plastic, such as a maleic anhydride grafted polypropylene, a maleic anhydride grafted polyethylene, a maleic anhydride grafted polybutene, or a combination thereof. The compatibilizer can also include an acrylate based co-polymer. For example, the compatibilizer can include an ethylene methyl acrylate co-polymer, an ethylene butyl-acrylate co-polymer, or an ethylene ethyl acrylate co-polymer. Additionally, the compatibilizer can include a poly(vinyacetate) based compatibilizer. In an embodiment, the compatibilizer may be a grafted version of the non-biodegradable plastic material (e.g., maleic anhydride grafted polyethylene where the non-biodegradable plastic material is polyethylene) or a copolymer (e.g., a block copolymer) where one of the blocks is of the same monomer as the non-biodegradable plastic material (e.g., a styrene copolymer where the non-biodegradable plastic material is polystyrene or ABS).

The mixture of materials may include at least 0.5%, at least 1%, at least 2%, at least 3%, at least 4%, at least 5%, no greater than 50%, no greater than 45%, no greater than 40%, no greater than 35%, no greater than 30%, no greater than 25%, no greater than 20%, no greater than 15%, no greater than 10%, no greater than 9%, no greater than 8%, no greater than 7%, no greater than 6%, from 0.5% by weight to 12%, from 2% to 7%, or from 4% to 6% by weight of a compatibilizer.

Although certainly not required, and in at least some embodiments the inclusion of such would be best avoided, it is within the scope of the present invention to include any of a variety of UV and OXO degradable additives, such as PDQ-M, PDQ-H, BDA, and OxoTerra™ from Willow Ridge Plastics, OX1014 from LifeLine, or organic additives such as Restore® by Enso, EcoPure® by Bio-Tec Environmental, ECM Masterbatch Pellets 1M by ECM Biofilms, or Biodegradable 201 and/or Biodegradable 302 BioSphere®. Other additives, for example, for increased strength (e.g., Biomax® Strong from Dupont), or otherwise may be included.

One or more additives can be included in the mixture of materials in an amount of at least 0.5%, at least 1%, at least 1.5%, at least 2%, at least 2.5%, at least 3%, at least 4%, of no greater than 10%, no greater than 9%, no greater than 8%, no greater than 7%, no greater than 6%, no greater than 5%, from 0.2% to 12%, from 1% to 10%, from 0.5% to 4%., or from 2% by weight to 6% by weight of the mixture.

While principally described in the context of a mixture of thermoplastic materials that can be melted together, to form a desired blend, in some embodiments, it may be possible to blend the carbohydrate-based polymeric material capable of lending biodegradability with a plastic material that is not thermoplastic (e.g., that is thermoset, e.g., such as for silicone). For example, the resin components that are precursors of such non-thermoplastic non-biodegradable plastic material may be blended with the carbohydrate-based polymeric material, where polymerization or other formation of the non-thermoplastic material may occur in the presence of the carbohydrate-based polymeric material, resulting in a finished article that is a blend of the carbohydrate-based polymeric material and a thermoset or other non-thermoplastic plastic material, where the carbohydrate-based polymeric material may lend biodegradability to the non-thermoplastic plastic material upon blending of the two together.

Referring to FIG. 1, at 108, particularly where the materials are thermoplastic, the process 100 may include heating the mixture of materials. In an implementation, the mixture of materials can be heated to a temperature of at least 100° C., at least 110° C., at least 115° C., at least 120° C., at least 125° C., at least 130° C., at least 135° C., at least 140° C., no greater than 200° C., no greater than 190° C., no greater than 180° C., no greater than 175° C., no greater than 170° C., no greater than 165° C., no greater than 160° C., no greater than 155° C., no greater than 150° C., from 95° C. to 205° C., from 120° C. to 180° C., or from 125° C. to 165° C.

The mixture of materials including the non-biodegradable plastic material and the carbohydrate-based polymeric material can be heated in one or more chambers of an extruder. In some cases, one or more chambers of the extruder can be heated at different temperatures. The speed of one or more screws of the extruder can be any desired rate.

At 110, an article is produced using the mixture of materials. In some cases, the article can include a film. In other cases, the article can be formed from a film. In other embodiments, the article can have a shape based on a design, such as a mold (e.g., injection molded). Any conceivable article formed of plastic may be formed from the mixture, e.g., including but not limited to films, bags, bottles, caps, lids, sheets, boxes, plates, cups, utensils, and the like. Where the article is a film, the film can be formed using a die by injecting a gas into the heated mixture of material to form the film (i.e., blowing the film). Films can be sealed and/or otherwise modified to be in the form of a bag or other article.

Where the article is a film, the film can be comprised of a single layer or multiple layers. The film or any individual layers can have a thickness of at least 0.001 mm, at least 0.002 mm, at least 0.004 mm, at least 0.01 mm, at least 0.02 mm, at least 0.03 mm, at least 0.05 mm, at least 0.07 mm, at least 0.10 mm, no greater than 2 mm, no greater than 1 mm, no greater than 0.5 mm, no greater than 0.1 mm, from about 0.05 mm to about 0.5 mm, or from 0.02 mm to 0.05 mm. While there may be some overlap in thickness values for film and sheet articles, it will be appreciated that sheet materials of greater thickness than such film values may of course be provided, produced by any desired plastic manufacturing process.

Films or other articles can have strength characteristics that are characterized through testing, such as a dart drop impact test (ASTM D-1709), tensile strength at break test (ASTM D-882), tensile elongation at break test (ASTM D-882), a secant modulus test (ASTM D-882), and/or an Elmendorf Tear test (ASTM D-1922). Films can have a dart drop impact test value of at least 150 g, at least 175 g, at least 200 g, at least 225 g, at least 250 g, at least 275 g, at least 300 g, no greater than 400 g, no greater than 375 g, no greater than 350 g, or no greater than 325 g, from 140 g to 425 g, from 200 g to 400 g, from 250 g to 350 g, from 265 g to 330 g. In an implementation, such values may be for whatever the thickness of the film is. In another implementation, such values may for a 1 mil thickness film formed from the mixture of materials.

The article can have a tensile strength at break test value in the machine direction of at least 3.5 kpsi, at least 3.7 kpsi, at least 3.9 kpsi, at least 4.1 kpsi, at least 4.3 kpsi, or at least 4.5 kpsi, no greater than 5.5 kpsi, no greater than 5.3 kpsi, no greater than 5.1 kpsi, no greater than 4.9 kpsi, or no greater than 4.7 kpsi, from 3.5 kpsi to 5.5 kpsi, or from 4.1 kpsi to 4.9 kpsi.

The article can have a tensile strength at break test value in the transverse direction of at least 3.2 kpsi, at least 3.4 kpsi, at least 3.6 kpsi, at least 3.8 kpsi, at least 4.0 kpsi, at least 4.2 kpsi, no greater than 5.7 kpsi, no greater than 5.5 kpsi, no greater than 5.3 kpsi, no greater than 5.1 kpsi, no greater than 4.9 kpsi, no greater than 4.7 kpsi, no greater than 4.5 kpsi, from 3.2 kpsi to 5.7 kpsi, or from 3.6 kpsi to 5.0 kpsi.

The article can have a tensile elongation at break test value in the machine direction of at least 550%, at least 560%, at least 570%, at least 580%, at least 590%, at least 600%, at least 610%, at least 620%, no greater than 725%, no greater than 710%, no greater than 700%, no greater than 680%, no greater than 665%, no greater than 650%, no greater than 635%, from 550% to 750%, or from 600% to 660%.

The article can have a tensile elongation at break test value in the transverse direction of at least 575%, at least 590%, at least 600%, at least 615%, at least 630%, or at least 645%, no greater than 770%, no greater than 755%, no greater than 740%, no greater than 725%, no greater than 710%, no greater than 695%, no greater than 680%, from 575% to 775%, or from 625% to 700%.

Where applicable the article can have an Elmendorf tear force test value in the machine direction of at least 280 g/mil, at least 300 g/mil, at least 320 g/mil, at least 340 g/mil, or at least 360 g/mil, no greater than 450 g/mil, no greater than 430 g/mil, no greater than 410 g/mil, no greater than 390 g/mil, or no greater than 370 g/mil, from 275 g/mil to 475 g/mil, or from 325 g/mil to 410 g/mil.

Where applicable the article can have an Elmendorf tear force test value in the transverse direction of at least 475 g/mil, at least 490 g/mil, at least 500 g/mil, at least 525 g/mil, at least 540 g/mil, or at least 550 g/mil, no greater than 700 g/mil, no greater than 680 g/mil, no greater than 650 g/mil, no greater than 625 g/mil, no greater than 600 g/mil, no greater than 580 g/mil, or no greater than 570 g/mil, from 475 g/mil to 725 g/mil, or from 490 g/mil to 640 g/mil.

Where applicable the article can have a secant modulus of elasticity test value in the machine direction of at least 20 kpsi, at least 22 kpsi, at least 24 kpsi, at least 26 kpsi, at least 28 kpsi, or at least 30 kpsi, no greater than 40 kpsi, no greater than 38 kpsi, no greater than 36 kpsi, no greater than 34 kpsi, or no greater than 32 kpsi, from 20 kpsi to 40 kpsi, or from 25 kpsi to 35 kpsi.

Where applicable the article can have a secant modulus of elasticity test value in the transverse direction of at least 20 kpsi, at least 22 kpsi, at least 24 kpsi, at least 26 kpsi, at least 28 kpsi, or at least 30 kpsi, no greater than 40 kpsi, no greater than 38 kpsi, no greater than 36 kpsi, no greater than 34 kpsi, or no greater than 32 kpsi, from 20 kpsi to 40 kpsi, or from 25 kpsi to 35 kpsi.

In some cases, articles including a carbohydrate-based polymeric material formed from a mixture of two or more starches have values of strength properties that are greater than articles including a carbohydrate-based polymeric material formed from a single starch. For example, an article including a carbohydrate-based polymeric material formed from a mixture of two or more starches can have a dart drop impact test value (in grams or g/mil of thickness) that is at least about 10% greater than an article where the carbohydrate-based polymeric material is formed from a single starch, at least about 25% greater, at least about 50% greater, at least about 75% greater, from 10% greater to 150% greater or from 60% greater to 120% greater than the same article but including a carbohydrate-based polymeric material formed from a single starch. Details of such increased strength is found within U.S. patent application Ser. Nos. 14/853,725 and 15/481,806, already incorporated by reference.

When subjected to biodegradation testing (e.g., whether biomethane potential testing, or any applicable ASTM standard, such as ASTM D-5511, ASTM D-5526, ASTM D-5338, or ASTM D-6691. Under such testing, and within a given time period (e.g., 30 days, 60 days, 90 days, 180 days, 365 days (1 year), 2 years, 3 years, 4 years, or 5 years, the article may show substantial biodegradation of the total polymeric content, and/or the non-biodegradable plastic content (apart from the carbohydrate-based polymeric content). Biomethane potential testing is typically conducted over 30 or 60 days, although sometimes for as long as 90 days. The longer time period tests are more typically performed under any of the above mentioned ASTM standards.

For example, an article that may be free or substantially free of a biodegradation enhancing additive may show biodegradation that is greater than the carbohydrate-based polymeric material content thereof, indicating that the other plastic material(s) are also biodegrading (or exhibit the potential to biodegrade under a biomethane potential test).

Particularly when subjecting the articles to testing simulating biodegradation under landfill or other degradation conditions (e.g., composting conditions, or marine conditions) for 180 days, 200 days, 365 days (1 year), 2 years, 3 years, or 5 years, the biodegradation can be greater than the weight percent of carbohydrate-based polymeric materials within the article. In other words, inclusion of the described carbohydrate-based polymeric materials can result in at least some biodegradation of the non-biodegradable plastic material (which materials alone are not biodegradable).

For example, an article that is formed from a blend of the carbohydrate-based polymeric materials and PE may exhibit biodegradation after such periods of time that is greater than the weight fraction of the carbohydrate-based polymeric materials in the film, indicating that the PE (heretofore considered to not be biodegradable) is actually being biodegraded, with the carbohydrate-based polymeric material. Such results are surprising, and particularly advantageous.

Biomethane potential testing determines the potential for anaerobic biodegradation based on methanogenesis as a percent of total methanogenesis potential. Biomethane potential testing can be used to predict biodegradability of the tested samples according to the ASTM D-5511 standard and the biomethane potential testing can be conducted using one or more conditions from the ASTM D-5511 standard. For example, the biomethane potential testing can take place at a temperature of about 52° C. Additionally, the biomethane potential testing can have some conditions that are different from those of ASTM D-5511, e.g., to accelerate the test so to be completed within the typical 30, 60, or sometimes as long as 90 days. Biomethane potential testing can employ an inoculum having from 50% to 60% by weight water and from 40% to 50% by weight organic solids. For example, an inoculum used in biomethane potential testing can have 55% by weight water and 45% by weight organic solids. Biomethane potential testing can also take place at other temperatures, such as from 35° C. to 55° C. or from 40° C. to 50° C.

When subjected to biodegradation testing, an article having no greater than about 2% by weight of a biodegradation enhancing additive (or preferably being free thereof) and having an amount of carbohydrate-based polymeric material and non-biodegradable plastic material as described herein can exhibit enhanced degradation, as a result of the introduction of the carbohydrate-based polymeric material into the article. For example, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or even at least 95% of the non-carbohydrate-based polymeric material (e.g., the non-biodegradable plastic material) may biodegrade over a period of at least about 1 year, at least about 2 years, at least about 3 years, or at least about 5 years when subjected to landfill, composting, and/or marine conditions (or conditions simulating such). Such biodegradation is particularly remarkable and advantageous. Thus not only does the carbohydrate-based polymeric material biodegrade, but the non-biodegradable plastic material does as well.

The Examples show that with increased time, the amount of biodegradation can be very high, such that in at least some implementations, substantially the entire article biodegrades (e.g., biodegradation of at least about 85%, at least about 90%, or at least about 95% within 180 days, or 200 days, or 365 days (1 year), within 2 years, within 3 years, within 5 years, or other period).

Figure 2:
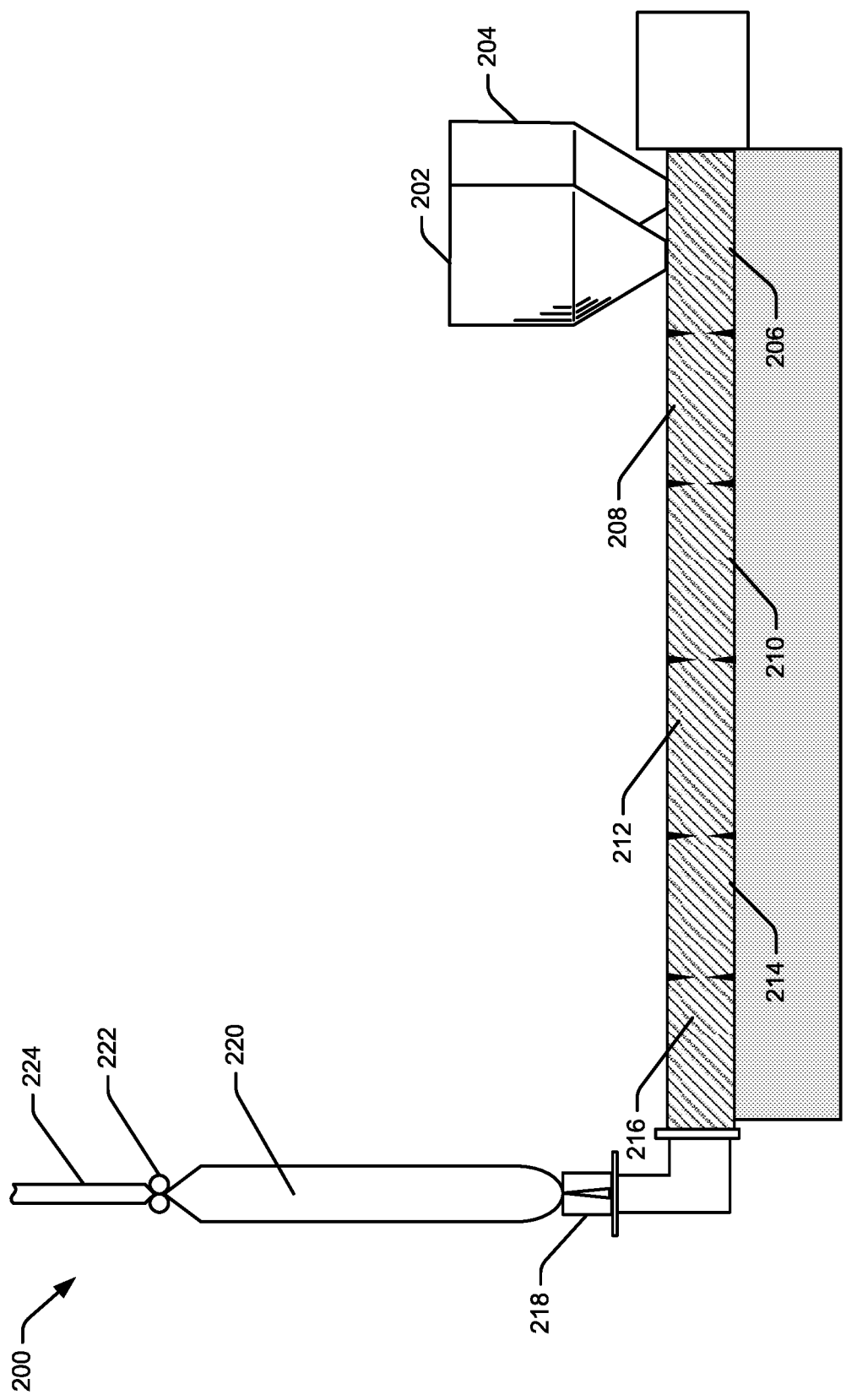
FIG. 2 illustrates components of an example manufacturing system to produce articles including biodegradable materials.

FIG. 2 illustrates components of an example manufacturing system 200 to produce articles according to the present disclosure. In some cases, the manufacturing system 200 can be used in the process 100 of FIG. 1. In an illustrative example, the manufacturing system 200 is an extruder, such as a single screw extruder or a twin screw extruder.

In an implementation, one or more non-biodegradable plastic materials and one or more carbohydrate-based polymeric materials are provided via a first hopper 202 and a second hopper 204. A compatibilizer may be included with either or both materials (e.g., in a masterbatch thereof).

The one or more carbohydrate-based polymeric materials and the one or more non-biodegradable plastic materials can be mixed in a first chamber 206 to produce a mixture of materials. In some cases, the mixture of materials can include from 5% by weight to 40% by weight of the one or more carbohydrate-based polymeric materials, from 60% by weight to 94% by weight of the one or more non-biodegradable plastic materials, and from 1% by weight to 9% by weight of the one or more compatibilizers. The ranges of course may be varied outside the above ranges, depending on desired characteristics.

In the example implementation shown in FIG. 2, the mixture of materials can pass through a number of chambers, such as the first chamber 206, a second chamber 208, a third chamber 210, a fourth chamber 212, a fifth chamber 214, and an optional sixth chamber 216. The mixture of materials can be heated in the chambers 206, 208, 210, 212, 214, 216. In some cases, a temperature of one of the chambers can be different from a temperature of another one of the chambers. In an illustrative example, the first chamber 206 is heated to a temperature from 120° C. to 140° C.; the second chamber 208 is heated to a temperature from 130° C. to 160° C.; the third chamber 210 is heated to a temperature from 135° C. to 165° C.; the fourth chamber 212 is heated to a temperature from 140° C. to 170° C.; the fifth chamber 214 is heated to a temperature from 145° C. to 180° C.; and the optional sixth chamber 216 is heated to a temperature from 145° C. to 180° C.

The heated mixture can then be extruded using a die 218 to form an extruded object, such as a film, sheet, or the like. Injection molding, thermoforming, or other plastic production processes may be used to manufacture various articles such as utensils, plates, cups bottles, caps or lids therefore, or the like. In film blowing, a gas can be injected into the extruded object to expand it with a pressure from 105 bar to 140 bar. The resulting tube 220 can be drawn up through rollers 222 to create a film 224 with a thickness typically from 0.02 mm (about 0.8 mil) to 0.05 mm (about 2 mil). Even thinner films can be made using the blends as described herein, e.g., having a thickness as little as 0.1 mil (0.004 mm). Of course, thicknesses greater than 2 mil can also be achieved. In some cases, the film 224 can be comprised of a single layer. In other cases, the film 224 can be comprised of multiple layers. Where multiple layers are present, at least one of the layers may include the carbohydrate-based polymeric material. In some embodiments, the carbohydrate-based polymeric material may be present in one or more outer layers. In another embodiment, the carbohydrate-based polymeric material may be present in an inner layer. Where no carbohydrate-based polymeric material is included in the outer layer(s), biodegradation of the outer layer(s) may not occur.

The concepts described herein will be further described in the following examples.

EXAMPLES

Example 1

Figure 4A:
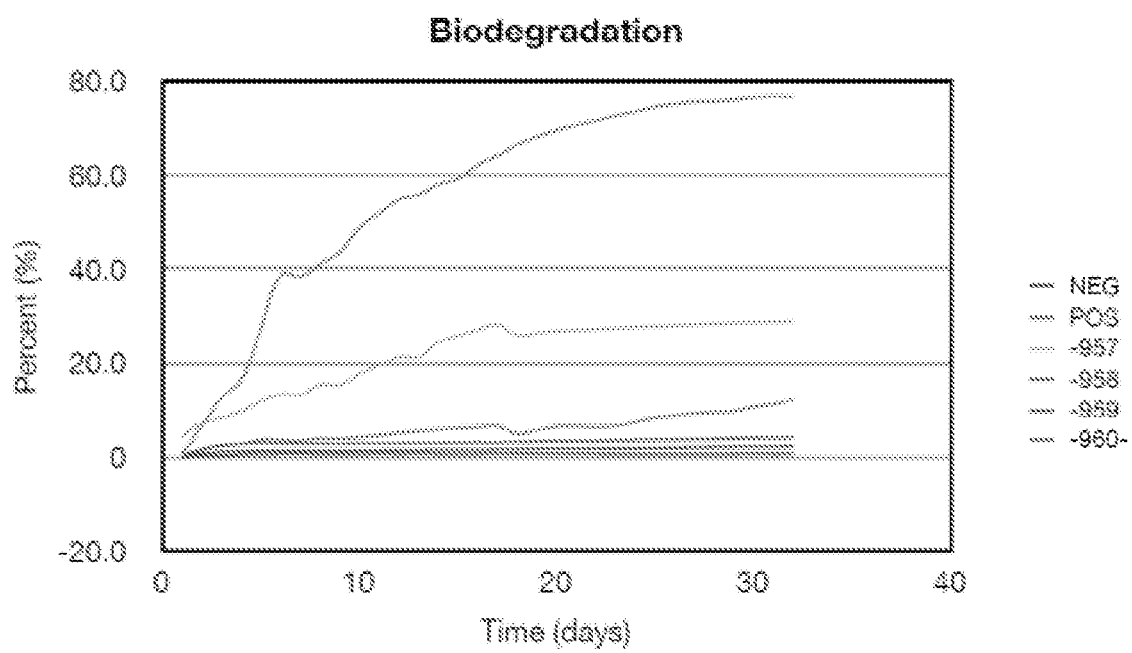
FIG. 4A and FIG. 4B illustrate percent biodegradation measured over 32 days according to biomethane potential testing of four samples formed according to techniques described herein.
Figure 4B:
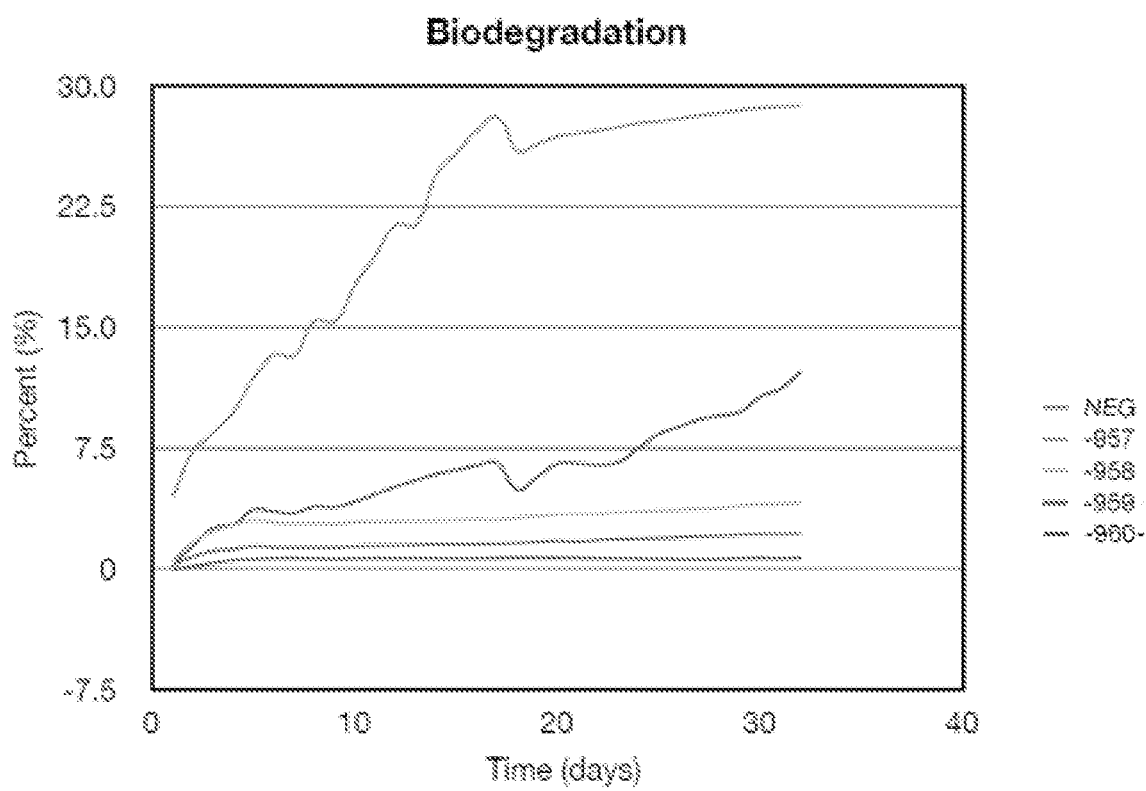

Seven samples were tested for 32 days to determine biodegradability characteristics using biomethane potential testing, to determine the potential for anaerobic biodegradation based on methanogenesis as a percent of total methanogenesis potential. The biomethane potential test was intended to replicate the conditions of a full-scale anaerobic digester (landfill). The biomethane potential test was conducted at a temperature of about 52° C. using an inoculum having about 55% by weight water and about 45% by weight organic solids. The positive control sample was cellulose and the negative control sample was polyethylene. The results of four samples, each of which included a blend of a carbohydrate-based polymeric material with polyethylene (referred to as 957, 958, 959, and 960) are shown in FIGS. 4A and 4B and in Table 2.

TABLE 2

|  | Inoculum | Negative | Positive | 957 | 958 | 959 | 960 |
| --- | --- | --- | --- | --- | --- | --- | --- |
| Cumulative Gas Volume (mL) | 729.6 | 962.5 | 8184.2 | 13366.8 | 2805.7 | 2995.4 | 5599.0 |
| Percent $CH_4$ (%) | 18.4 | 19.3 | 35.4 | 29.2 | 21.8 | 0.0 | 33.6 |
| Volume $CH_4$ (mL) | 134.2 | 185.5 | 2898.2 | 3904.4 | 612.4 | 0.0 | 1880.7 |
| Mass $CH_4$ (g) | 0.10 | 0.13 | 2.07 | 2.79 | 0.44 | 0.00 | 1.34 |
| Percent $CO_2$ (%) | 49.9 | 44.0 | 44.5 | 43.4 | 43.2 | 40.2 | 45.4 |
| Volume $CO_2$ (mL) | 364.0 | 423.3 | 3639.8 | 5799.9 | 1211.8 | 1204.2 | 2544.1 |
| Mass $CO_2$ (g) | 0.72 | 0.83 | 7.15 | 11.39 | 2.38 | 2.37 | 5.00 |
| Sample Mass (g) | 1,000 | 10 | 10 | 20.0 | 20.0 | 20 | 20 |
| Theoretical Sample Mass (g) | 0.0 | 8.6 | 4.2 | 17.1 | 17.1 | 17.1 | 17.1 |
| Biodegraded Mass (g) | 0.27 | 0.33 | 3.50 | 5.20 | 0.98 | 0.65 | 2.37 |
| Percent Biodegraded (%) |  | 0.7 | 76.7 | 28.8 | 4.1 | 2.2 | 12.3 |
| Adjusted Percent Biodegraded (%) |  | 0.9 | 100.0 | 37.5 | 5.4 | 2.9 | 16.0 |

Figure 5A:
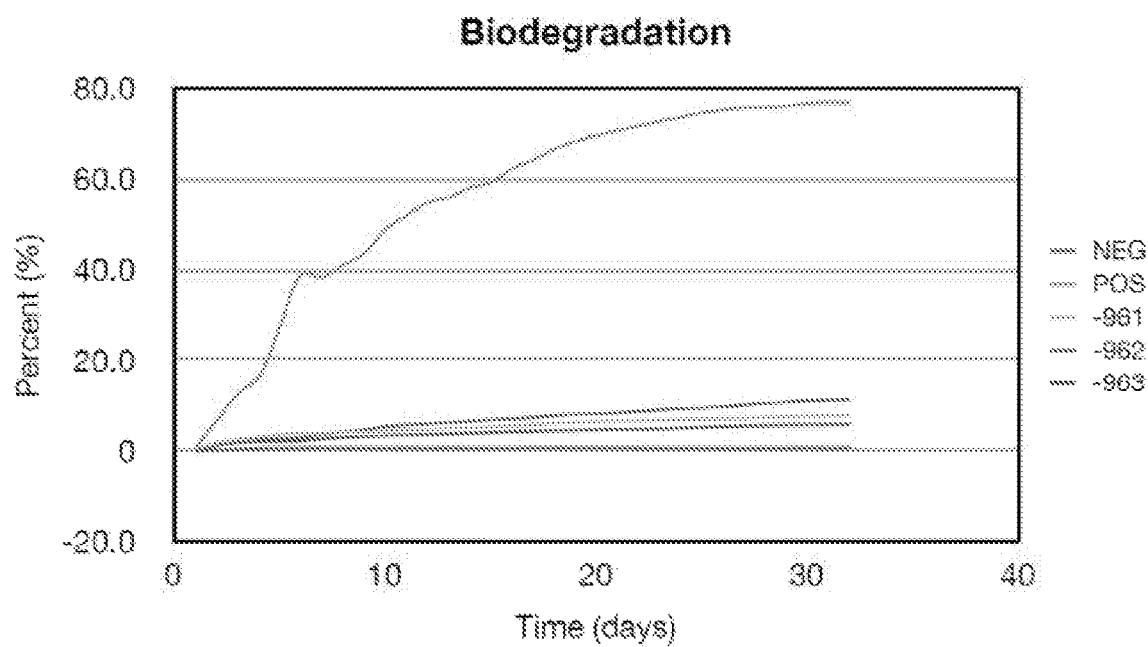
FIG. 5A and FIG. 5B illustrate percent biodegradation measured over 32 days according to biomethane potential testing of three additional samples formed according to techniques described herein.
Figure 5B:
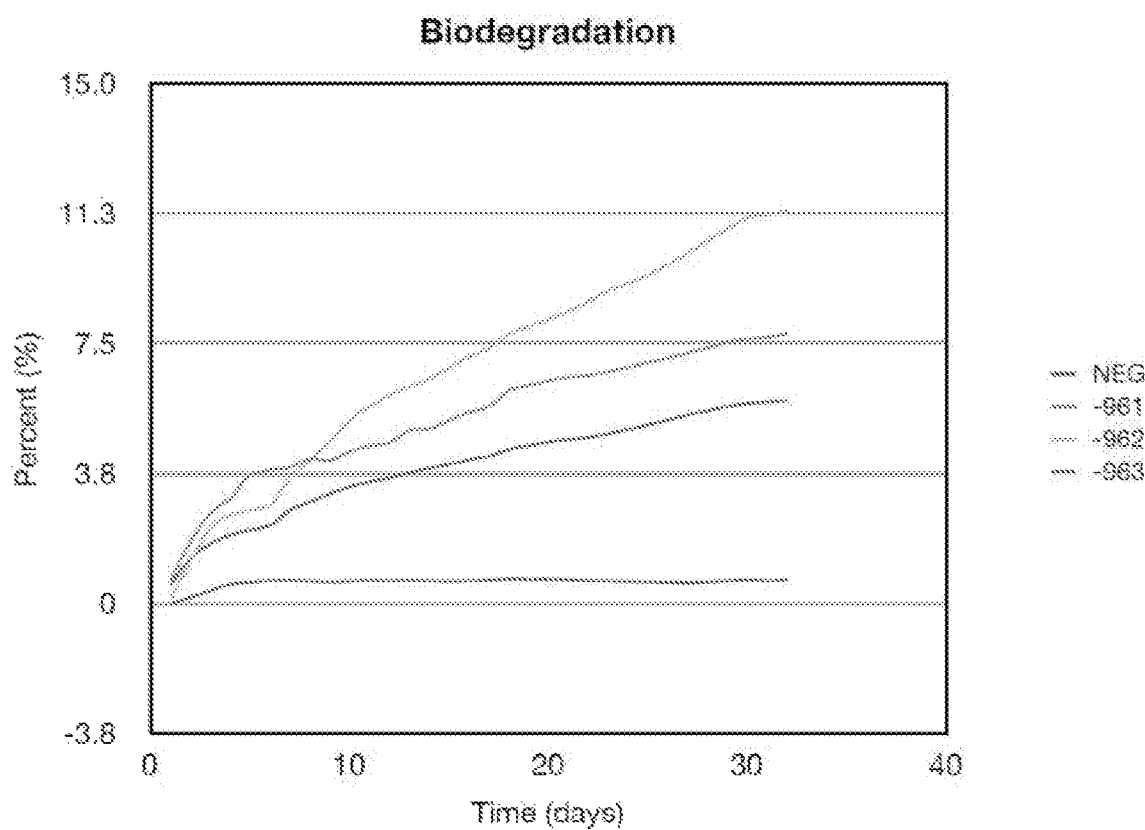

The results of biomethane potential testing for samples 961, 962, and 963 are shown in FIGS. 5A and 5B, and Table 3.

TABLE 3

|  | Inoculum | Negative | Positive | 961 | 962 | 963 |
| --- | --- | --- | --- | --- | --- | --- |
| Cumulative Gas Volume (mL) | 729.6 | 962.5 | 8184.2 | 4286.4 | 5538.9 | 5796.5 |
| Percent $CH_4$ (%) | 18.4 | 19.3 | 35.4 | 27.1 | 31.8 | 0.0 |
| Volume $CH_4$ (mL) | 134.2 | 185.5 | 2898.2 | 1161.9 | 1759.5 | 0.0 |
| Mass $CH_4$ (g) | 0.10 | 0.13 | 2.07 | 0.83 | 1.26 | 0.00 |
| Percent $CO_2$ (%) | 49.9 | 44.0 | 44.5 | 42.5 | 42.7 | 40.9 |
| Volume $CO_2$ (mL) | 364.0 | 423.3 | 3639.8 | 1821.0 | 2363.9 | 2370.7 |
| Mass $CO_2$ (g) | 0.72 | 0.83 | 7.15 | 3.58 | 4.64 | 4.66 |
| Sample Mass (g) | 1,000 | 10 | 10 | 20.0 | 20.0 | 20 |
| Theoretical Sample Mass (g) | 0.0 | 8.6 | 4.2 | 17.1 | 17.1 | 17.1 |
| Biodegraded Mass (g) | 0.27 | 0.33 | 3.50 | 1.60 | 2.21 | 1.27 |
| Percent Biodegraded (%) |  | 0.7 | 76.7 | 7.8 | 11.3 | 5.9 |
| Adjusted Percent Biodegraded (%) |  | 0.9 | 100.0 | 10.1 | 14.8 | 7.6 |

The content and form of the samples tested can be found in Table 4. The carbohydrate-based polymeric material was formed from 27% glycerin (99% pure) and 73% starch, and exhibited <about 1% water.

TABLE 4

| Sample No. | Starch-Based Polymer (%) | Polyethylene (%) | EcoFLEX ™ (%) | Maleic Anhydride Modified LLDPE (%) | Additive (%) | Biodegradation-Enhancing Additive | Form |
|---|---|---|---|---|---|---|---|
| 957 | 100 | 0 | | 0 | 0 | — | Press-outs |
| 958 | 25 | 70 | | 5 | 0 | — | Film |
| 959 | 30 | 65 | | 5 | 0 | — | Film |
| 960 | 25 | 70 | | 5 | 0 | — | Bag |
| 961 | 25 | 69 | | 5 | 1 | Enso Restore | Film |
| 962 | 25 | 69.5 | | 5 | 0.5 | Bio-B | Film |
| 963 | 30 | 15 | 50 | 5 | 0 | — | Film |

EcoFLEX ™ refers to the plastic product available from BASF under that tradename.
Bio-B refers to a degradation enhancing additive available from BiologiQ.
Enso Restore refers to the UV and/or OXO additive available from Enso

Example 2

Figure 6A:
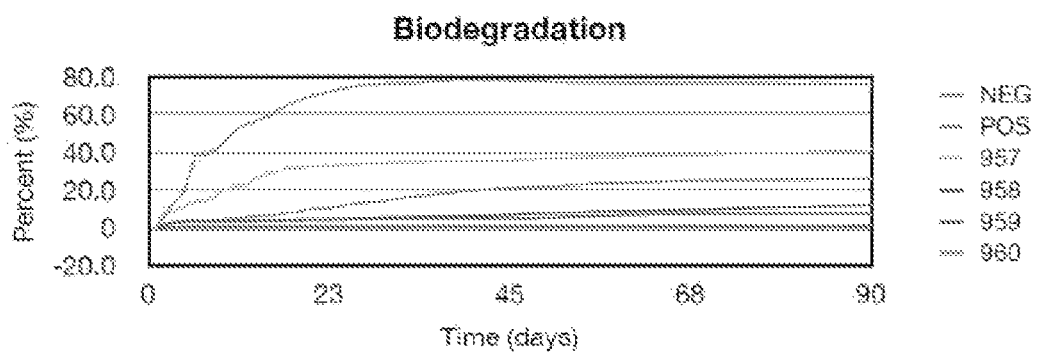
FIG. 6A and FIG. 6B illustrate percent biodegradation measured over 91 days according to biomethane potential testing of four samples formed according to techniques described herein.
Figure 6B:
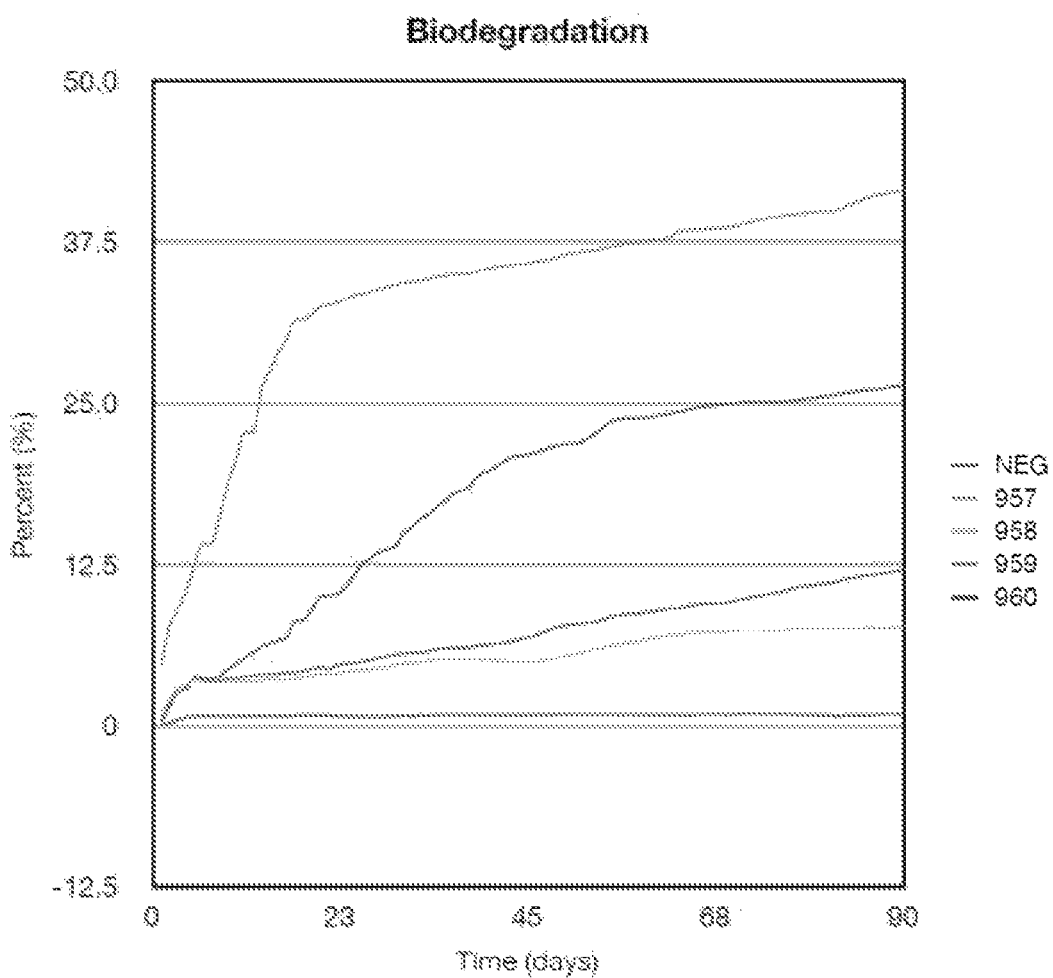

Seven samples were tested for 91 days to determine biodegradability characteristics using biomethane potential testing conducted at a temperature of about 52° C. using an inoculum having about 55% by weight water and about 45% by weight organic solids, to determine the potential for anaerobic biodegradation based on methanogenesis as a percent of total methanogenesis potential. The positive control sample was cellulose and the negative control sample was untreated polyethylene. The results of sample numbers 957, 958, 959, and 960 (compositions shown in Table 4) are shown in FIGS. 6A and 6B and in Table 5.

TABLE 5

|  | Inoculum | Negative | Positive | 957 | 958 | 959 | 960 |
|---|---|---|---|---|---|---|---|
| Cumulative Gas Volume (mL) | 811.3 | 1067.4 | 8211.9 | 18074.3 | 4045.8 | 5643.8 | 10915.8 |
| Percent $CH_4$ (%) | 22.3 | 23.2 | 35.5 | 34.7 | 32.7 | 39.4 | 42.2 |
| Volume $CH_4$ (mL) | 180.6 | 248.1 | 2914.5 | 6273.2 | 1321.2 | 2224.8 | 4608.8 |
| Mass $CH_4$ (g) | 0.13 | 0.18 | 2.08 | 4.48 | 0.94 | 1.59 | 3.29 |
| Percent $CO_2$ (%) | 48.4 | 43.1 | 44.4 | 42.6 | 42.1 | 39.7 | 40.3 |
| Volume $CO_2$ (mL) | 392.4 | 460.3 | 3649.4 | 7692.5 | 1703.2 | 2238.1 | 4401.5 |
| Mass $CO_2$ (g) | 0.77 | 0.90 | 7.17 | 15.11 | 3.35 | 4.40 | 8.65 |
| Sample Mass (g) | 1,000 | 10 | 10 | 20.0 | 20.0 | 20 | 20 |
| Theoretical Sample Mass (g) | 1.0 | 8.6 | 4.2 | 17.1 | 17.1 | 17.1 | 17.1 |
| Biodegraded Mass (g) | 0.31 | 0.38 | 3.52 | 7.48 | 1.62 | 2.39 | 4.83 |
| Percent Biodegraded (%) |  | 0.8 | 76.1 | 41.9 | 7.7 | 12.2 | 26.4 |
| Adjusted Percent Biodegraded (%) |  | 1.1 | 100.0 | 55.0 | 10.1 | 16.0 | 34.7 |

Figure 7A:
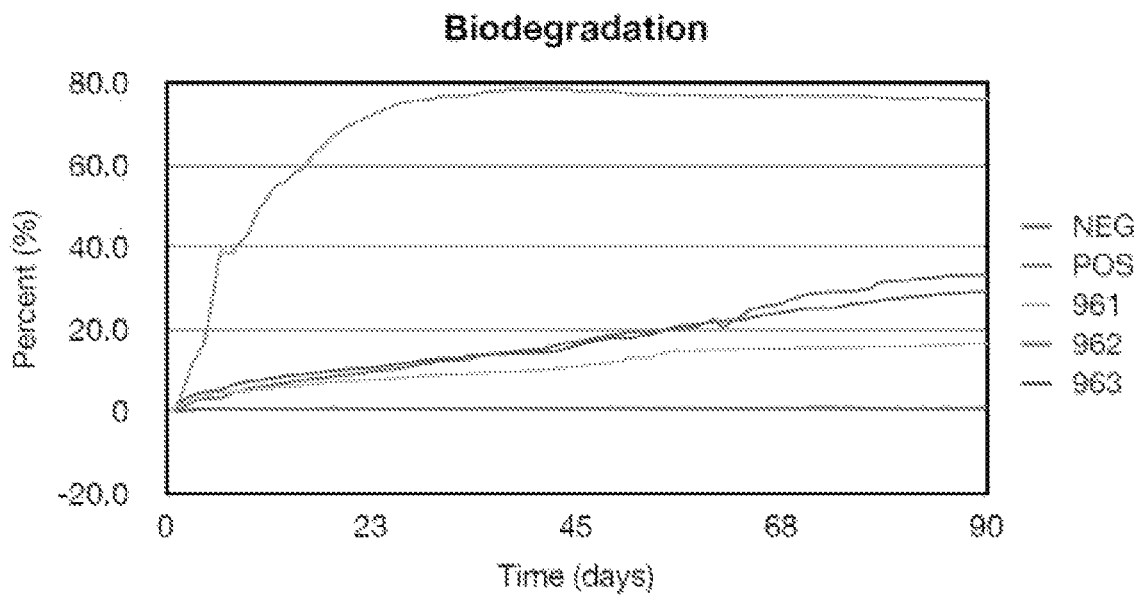
FIG. 7A and FIG. 7B illustrate percent biodegradation measured over 91 days according to biomethane potential testing of three additional samples formed according to techniques described herein.
Figure 7B:
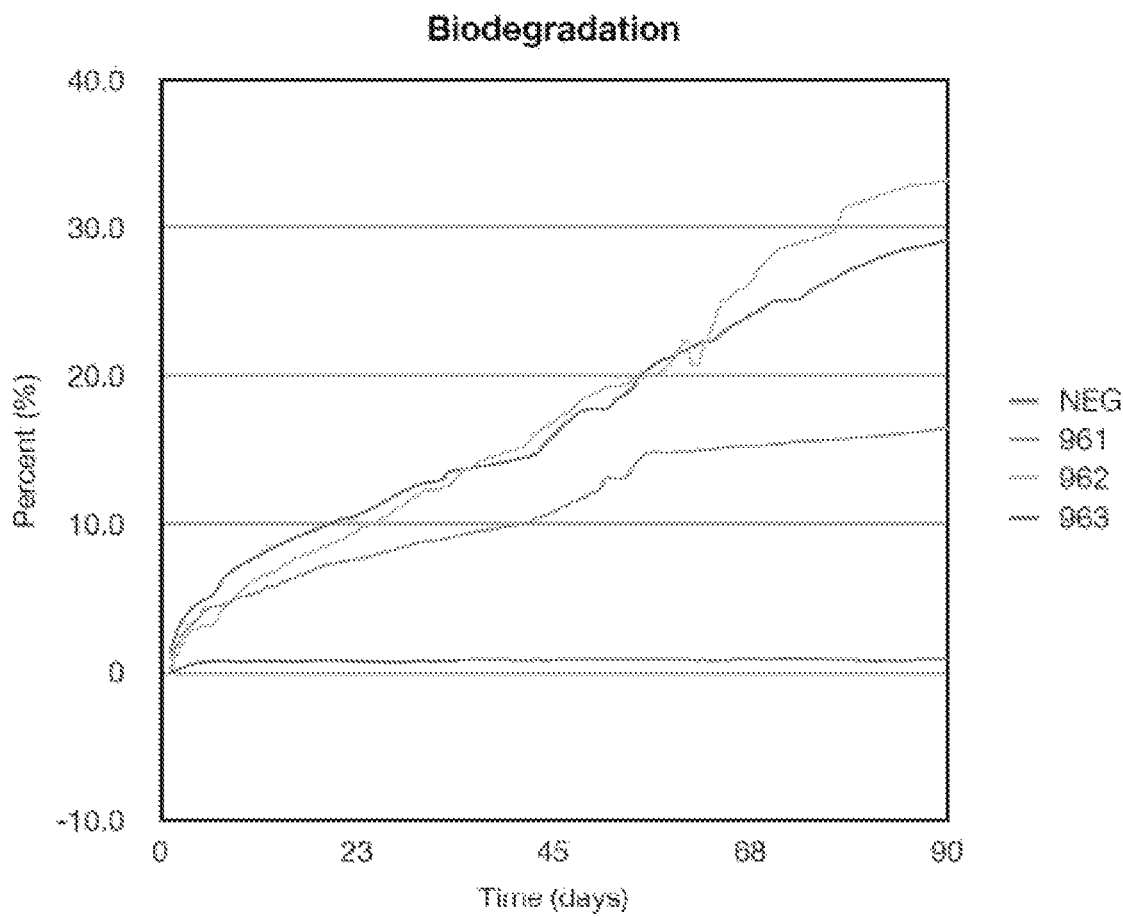

The biomethane potential testing results of sample numbers 961, 962, and 963 (compositions shown in Table 4) are shown in FIGS. 7A and 7B and in Table 6.

TABLE 6

|  | Inoculum | Negative | Positive | 961 | 962 | 963 |
|---|---|---|---|---|---|---|
| Cumulative Gas Volume (mL) | 811.3 | 1067.4 | 8211.9 | 7385.2 | 13059.8 | 11733.3 |
| Percent $CH_4$ (%) | 22.3 | 23.2 | 35.5 | 38.6 | 46.3 | 45.2 |
| Volume $CH_4$ (mL) | 180.6 | 248.1 | 2914.5 | 2849.9 | 6052.3 | 5302.2 |
| Mass $CH_4$ (g) | 0.13 | 0.18 | 2.08 | 2.04 | 4.32 | 3.79 |
| Percent $CO_2$ (%) | 48.4 | 43.1 | 44.4 | 40.9 | 39.8 | 39.6 |
| Volume $CO_2$ (mL) | 392.4 | 460.3 | 3649.4 | 3023.8 | 5197.1 | 4643.4 |
| Mass $CO_2$ (g) | 0.77 | 0.90 | 7.17 | 5.94 | 10.21 | 9.12 |
| Sample Mass (g) | 1,000 | 10 | 10 | 20.0 | 20.0 | 20 |
| Theoretical Sample Mass (g) | 0.0 | 8.6 | 4.2 | 17.1 | 17.1 | 17.1 |
| Biodegraded Mass (g) | 0.31 | 0.38 | 3.52 | 3.15 | 6.03 | 5.33 |
| Percent Biodegraded (%) |  | 0.8 | 76.1 | 16.6 | 33.4 | 29.3 |
| Adjusted Percent Biodegraded (%) |  | 1.1 | 100.0 | 21.8 | 43.9 | 38.5 |

Example 3

Figure 8A:
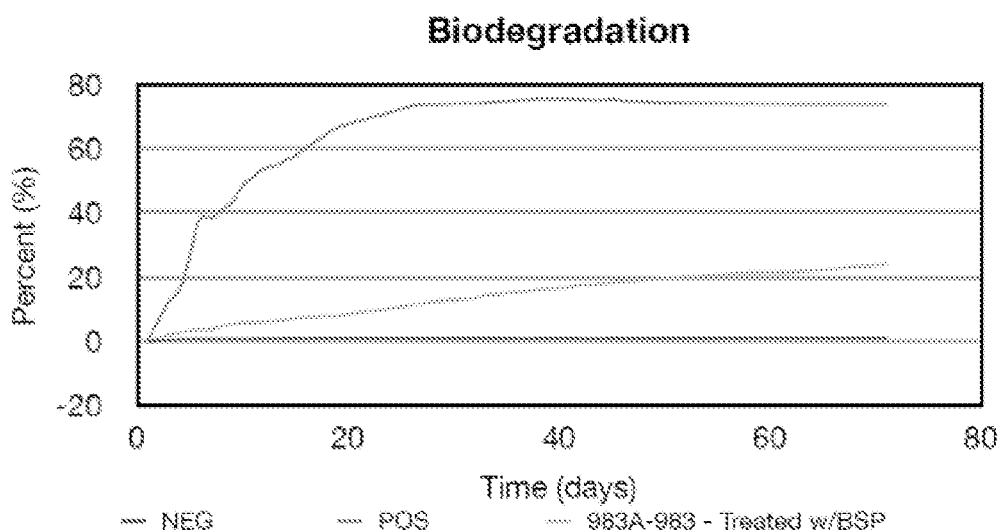
FIG. 8A and FIG. 8B illustrate percent biodegradation measured over 71 days according to biomethane potential testing of one sample formed according to techniques described herein.
Figure 8B:
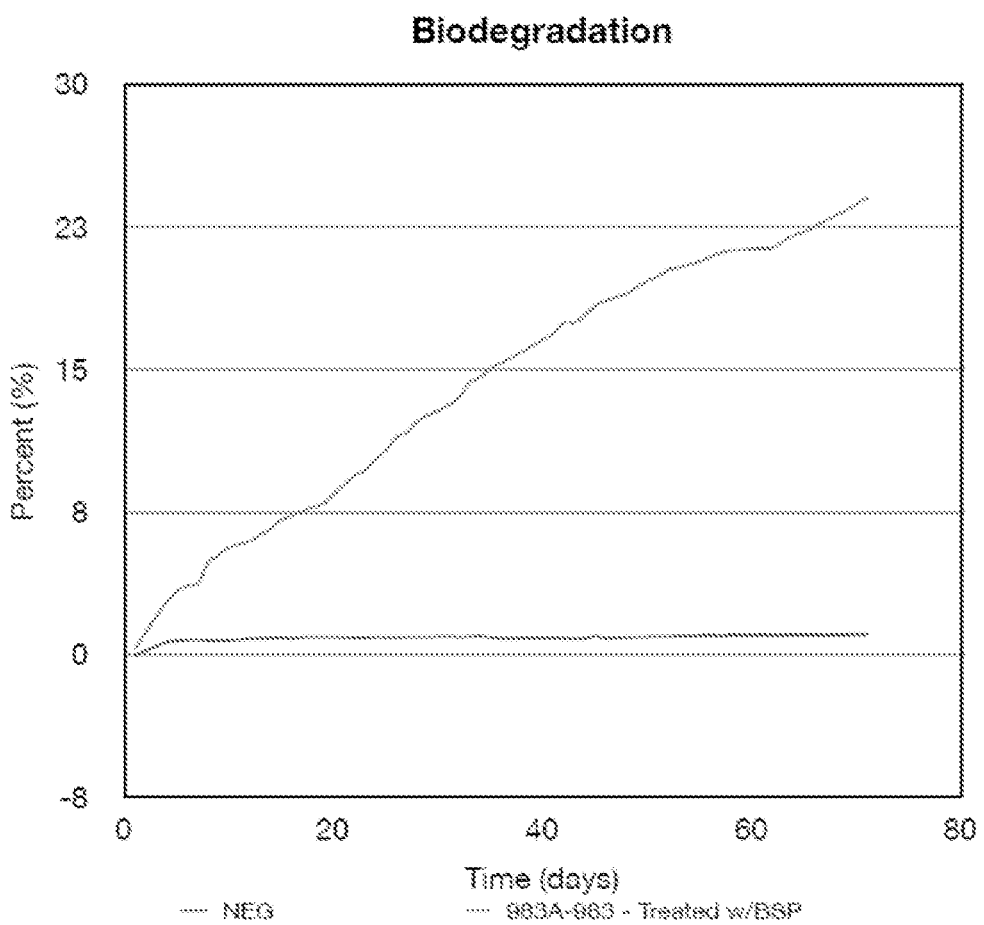

A film was tested for 71 days to determine biodegradability characteristics using biomethane potential testing conducted at a temperature of about 52° C. using an inoculum having about 55% by weight water and about 45% by weight organic solids, to determine the potential for anaerobic biodegradation based on methanogenesis as a percent of total methanogenesis potential. The positive control sample was cellulose and the negative control sample was untreated polyethylene. The film contained 25% starch-based polymer material (with 27% of the starch-based polymer material being formed from glycerin (99% pure) and 73% of the starch-based polymer material being formed from starch), and exhibited <about 1% water). The film included 1% Biosphere® additive; 5% maleic anhydride compatibilizer; and 69% modified LLDPE. The results of the biomethane potential testing of sample number 983 are shown in FIGS. 8A and 8B and in Table 7.

TABLE 7

|  | Inoculum | Negative | Positive | 983 |
| --- | --- | --- | --- | --- |
| Cumulative Gas Volume (mL) | 1021.1 | 1326.5 | 8225.8 | 10104.5 |
| Percent CH$_4$ (%) | 26.3 | 27.4 | 35.5 | 41.7 |
| Volume CH$_4$ (mL) | 268.4 | 363.3 | 2922.7 | 4214.4 |
| Mass CH$_4$ (g) | 0.19 | 0.26 | 2.09 | 3.01 |
| Percent CO$_2$ (%) | 47.6 | 42.3 | 44.4 | 41.9 |
| Volume CO$_2$ (mL) | 185.7 | 561.2 | 3654.2 | 4230.1 |
| Mass CO$_2$ (g) | 0.95 | 1.10 | 7.18 | 8.31 |
| Sample Mass (g) | 1,000 | 10 | 10 | 20.0 |
| Theoretical Sample Mass (g) | 0.0 | 8.6 | 4.2 | 17.1 |
| Biodegraded Mass (g) | 0.40 | 0.50 | 3.52 | 4.52 |
| Percent Biodegraded (%) |  | 1.1 | 73.9 | 24.0 |
| * Adjusted Percent Biodegraded (%) |  | 1.4 | 100.0 | 32.5 |

Example 4

Eight samples (sample numbers 957-963 and 983; compositions shown in Examples 1-3) were tested for 91 days to determine biodegradability characteristics using biomethane potential testing conducted at a temperature of about 52° C. using an inoculum having about 55% by weight water and about 45% by weight organic solids, to determine the potential for anaerobic biodegradation based on methanogenesis as a percent of total methanogenesis potential. The positive control sample was cellulose and the negative control sample was polyethylene. The results are shown in Table 8. The results shown in Table 8 indicate that samples formed from a mixture of a carbohydrate-based polymer and an otherwise non-biodegradable plastic material actually biodegrades to an extent that is greater than the amount of the carbohydrate-based polymer. In other words, some of the otherwise non-biodegradable plastic material was biodegrading, in addition to the biodegradation of the carbohydrate-based polymeric material. Such results were achieved even in samples that did not include any biodegradation enhancing additive. Such results are surprising, and particularly advantageous.

TABLE 8

| | % Degraded | | | | |
| --- | --- | --- | --- | --- | --- |
| Item # | 32 Days | 42 Days | 62 Days | 71 Days | 91 Days |
| 957 | 37.50% |  | 48.40% |  | 55.00% |
| 958 | 5.40% |  | 8.10% |  | 10.10% |
| 959 | 2.90% |  | 11.30% |  | 16.00% |
| 960 | 16.00% |  | 30.00% |  | 34.70% |
| 961 | 10.10% |  | 19.40% |  | 21.80% |
| 962 | 14.80% |  | 26.40% |  | 43.90% |
| 963 | 7.60% |  | 28.10% |  | 38.50% |
| 983 |  | 19.20% |  | 32.50% |  |

Example 5

Four samples (sample numbers 100, 200, 300, and 400) were tested for compostability under ASTM D-6400. The ASTM D-6400 standard specifies a phytotoxicity testing procedure, indicates that the biodegradation of articles is to be measured according to the ASTM D-5338-11 test, and that an elemental analysis is to utilize Table 3 of 40 C.P.R. Part 503.13. The compositions of the samples and the biodegradation portion of the compostability test results are shown in Table 9. The carbohydrate-based polymeric material was formed from a blend of starches including 90% corn starch and 10% potato starch. The non-biodegradable plastic material was polyethylene. The compatibilizer for samples 100 and 200 was a Bynel® compatibilizer from DuPont® and the compatibilizer for samples 300 and 400 was an Amplify compatibilizer from Dow®. The biodegradation enhancing additive for samples 100 and 200 was from Biosphere® and the biodegradation enhancing additive for sample 300 was from ENSO. Sample 200 also included EcoFLEX™ from BASF, which is a fossil fuel-based plastic that is compostable according to the ASTM D-6400 standard. The 98 day biodegradability results indicated the test chamber carbon dioxide measurement as a percentage of a theoretical maximum amount of carbon dioxide for the sample after 98 days. The 180 day biodegradability results indicated the test chamber carbon dioxide measurement as a percentage of a theoretical maximum amount of carbon dioxide after 180 days.

Figure 9A:
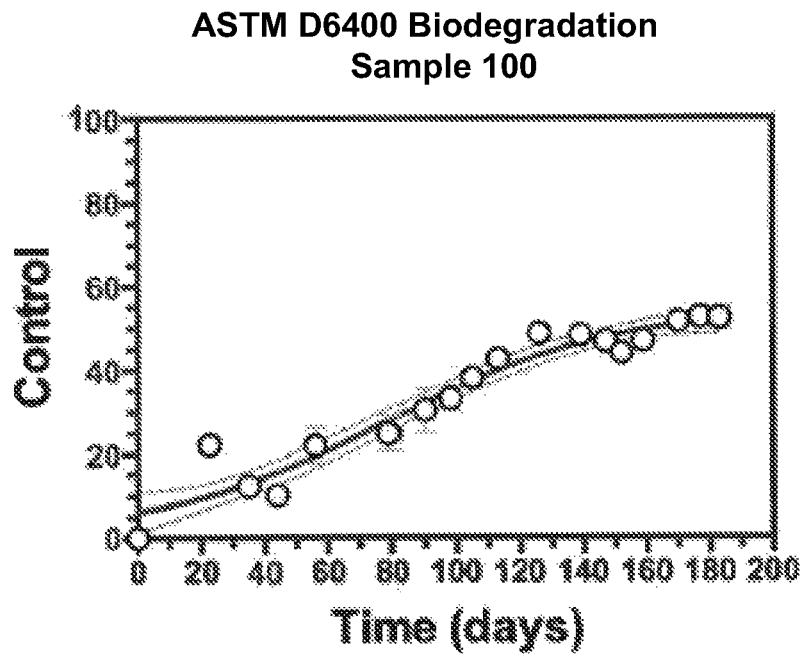
FIG. 9A and FIG. 9B show the results of the biodegradation portion of the ASTM D-6400 test performed according to ASTM D-5338 for a first sample and a second sample formed according to techniques described herein.
Figure 9B:
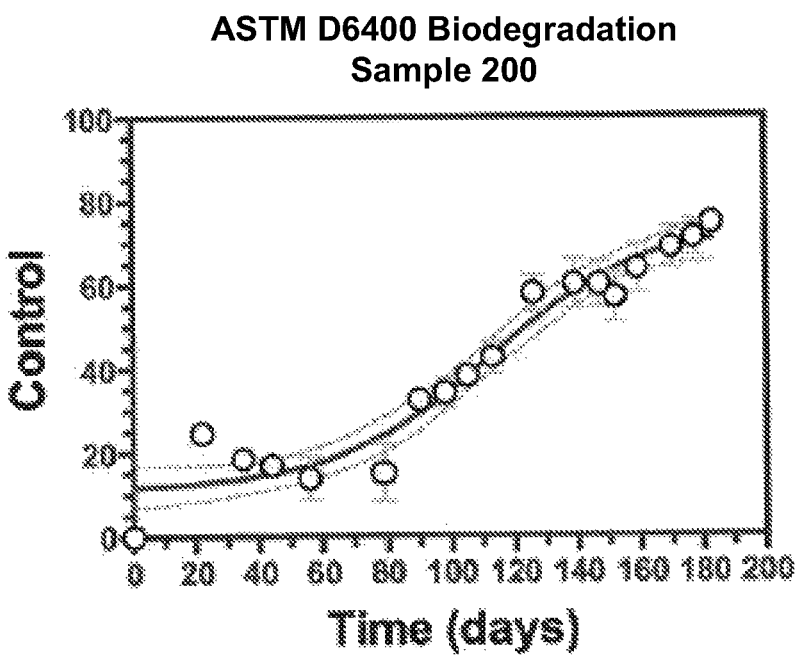
Figure 10A:
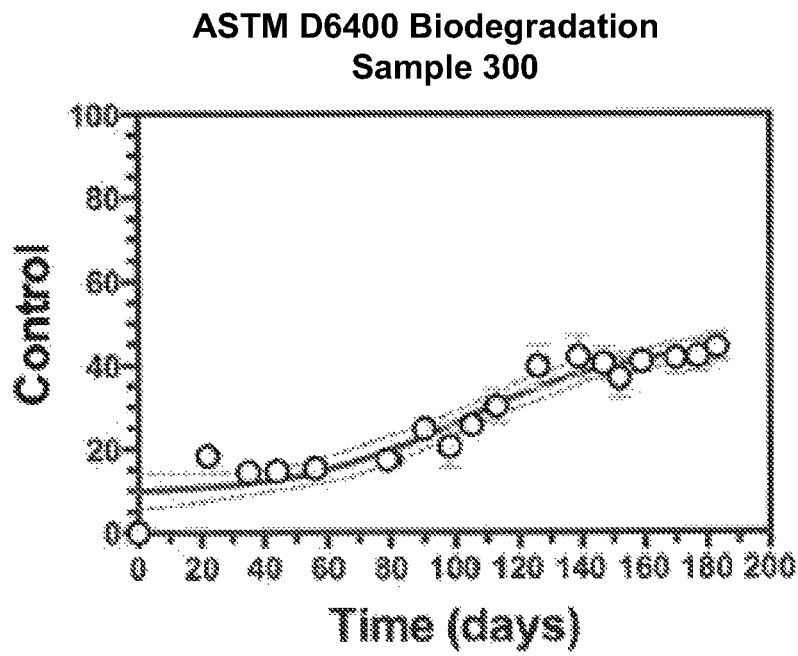
FIG. 10A and FIG. 10B show the results of the biodegradation portion of the ASTM D-6400 test performed according to ASTM D-5338 for a third sample and a fourth sample formed according to techniques described herein.
Figure 10B:
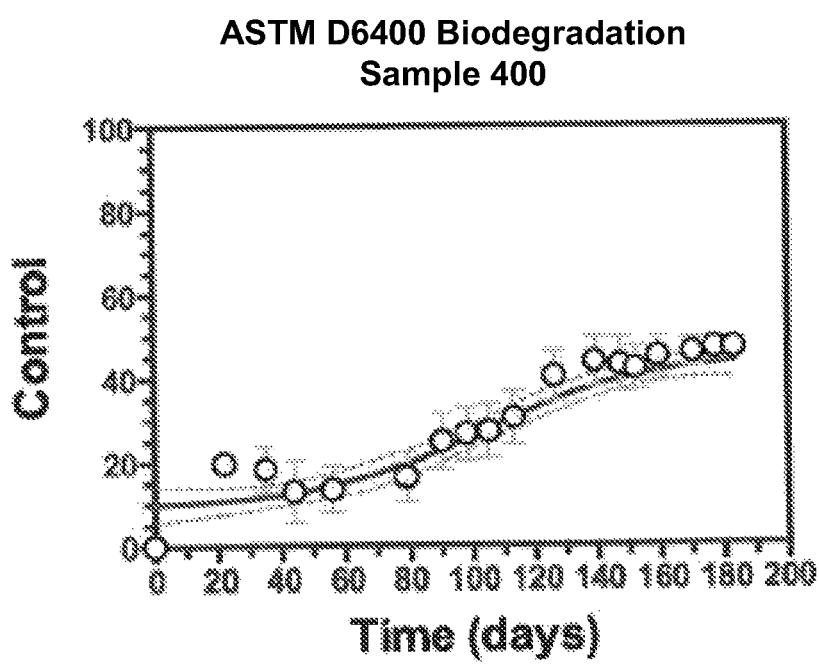

FIG. 9A shows the results of the biodegradation portion of the ASTM D-6400 test performed according to ASTM D-5338 for sample 100. FIG. 9B shows the results of the biodegradation portion of the ASTM D-6400 test performed according to ASTM D-5338 for sample 200. FIG. 10A shows the results of the biodegradation portion of the ASTM D-6400 test performed according to ASTM D-5338 for sample 300 and FIG. 10B shows the results of the biodegradation portion of the ASTM D-6400 test performed according to ASTM D-5338 for sample 400. The results of the biodegradation portion of the ASTM D-6400 test indicate that, after 180 days, an amount of first polymeric material (i.e., the polyethylene) in samples 100, 300, and 400 has degraded partially because the amount of carbon dioxide measured in the test chamber is greater than the percentage of the carbohydrate-based polymeric material included in these samples. Thus, at least a portion of the remainder of the carbon dioxide emissions is due to the degradation of the otherwise non-biodegradable plastic material. This observation includes sample 400, which is free of a biodegradation enhancing additive. Such a result is surprising and advantageous.

TABLE 9

|  | Sample No. 100 | Sample No. 200 | Sample No. 300 | Sample No. 400 |
|---|---|---|---|---|
| Carbohydrate-Based Polymeric Material | 30% | 30% | 40% | 25% |
| Polyethylene | 64% | 15% | 50% | 70% |
| Compatibilizer | 5% | 5% | 5% | 5% |
| Biodegradation Enhancing Additive | 1% | 1% | 5% | 0% |
| EcoFLEX ™ | 0% | 49% | 0% | 0% |
| Film Thickness (mm) | 0.34 | 0.34 | — | 0.44 |
| 98 Day Biodegradability Results | 33% | 29% | 20% | 22% |
| 180 Day Biodegradability Results | 55% | 74% | 45% | 48% |

EcoFLEX ™ refers to the plastic product available from BASF under that tradename.

Example 6

Figure 11A:
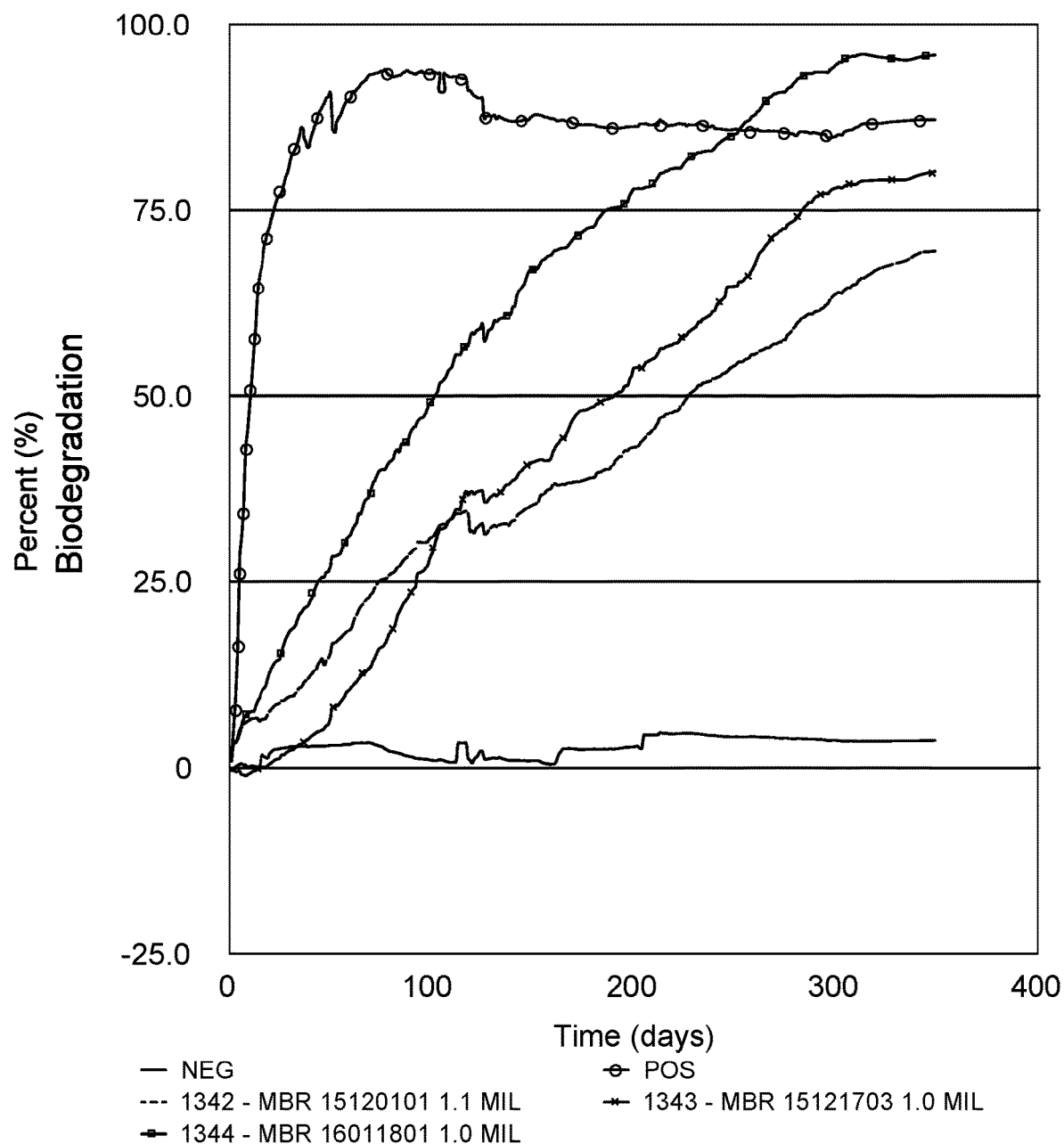
FIGS. 11A and 11B show percent biodegradation measured over 349 days according to testing conducted under ASTM D-5511 for three samples formed according to the present disclosure.
Figure 11B:
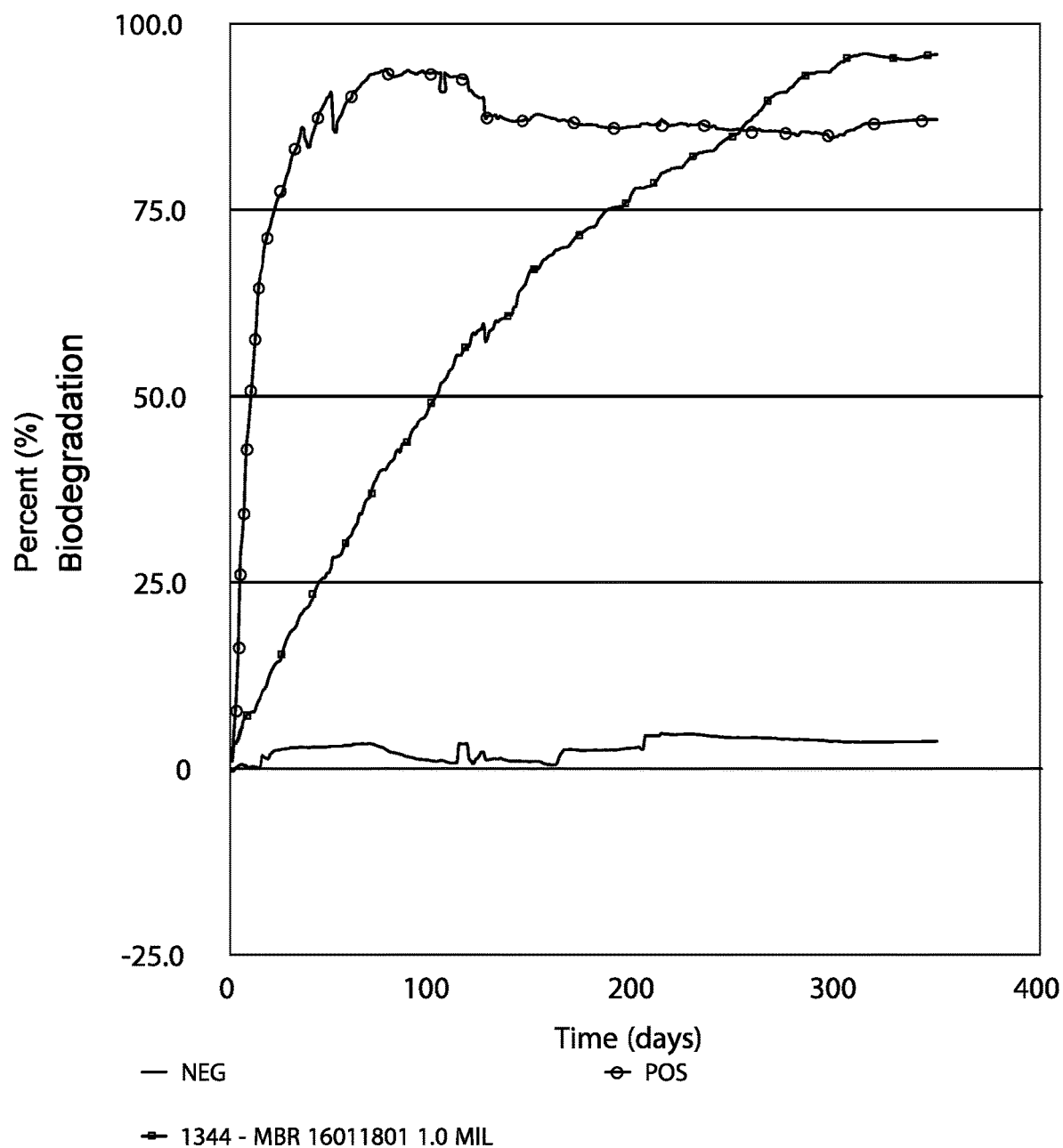

Three samples were tested for 349 days to determine biodegradability characteristics according to ASTM D-5511. The test was intended to replicate the conditions of a full-scale anaerobic digester (landfill). The results of the three samples (referred to as 1342, 1343, and 1344) are shown in FIGS. 11A-11B and in Table 10. FIG. 11A shows results for all of samples 1343, 1343, and 1344, as compared to the controls. FIG. 11B shows the results for sample 1344 alone, as compared to the controls. Sample 1342 was formed from 30% ESR (the carbohydrate-based polymeric material), 67% PBAT, and 3% compatibilizer, and had a thickness of 1.1 mil. Sample 1343 was formed from 27.5% ESR, 70% PBAT and 2.5% compatibilizer, and had a thickness of 1.0 mil. Sample 1344 was formed from 40% ESR, 56% LLDPE and 4% compatibilizer, and had a thickness of 1.0 mil.

TABLE 10

|  | Inoculum | Negative | Positive | 1342 | 1343 | 1344 |
|---|---|---|---|---|---|---|
| Cumulative Gas Volume (mL) | 4064.3 | 4898.8 | 12330.2 | 18429.0 | 20233.7 | 31171.1 |
| Percent CH$_4$ (%) | 43.2 | 43.6 | 41.4 | 48.8 | 53.7 | 51.7 |
| Volume CH$_4$ (mL) | 1757.0 | 2135.1 | 5101.0 | 8992.6 | 10865.0 | 16106.6 |
| Mass CH$_4$ (g) | 1.26 | 1.53 | 3.64 | 6.42 | 7.76 | 11.5 |
| Percent CO$_2$ (%) | 40.4 | 37.8 | 41.9 | 35.5 | 35.7 | 38.0 |
| Volume CO$_2$ (mL) | 1643.0 | 1852.9 | 5160.5 | 6547.5 | 7230.7 | 11838.7 |
| Mass CO$_2$ (g) | 3.23 | 3.64 | 10.14 | 12.86 | 14.20 | 23.25 |
| Sample Mass (g) | 10 | 10 | 10 | 20.0 | 20.0 | 20 |
| Theoretical Sample Mass (g) | 0.0 | 8.6 | 4.2 | 9.8 | 9.8 | 13.7 |
| Biodegraded Mass (g) | 1.82 | 2.14 | 5.50 | 8.33 | 9.69 | 14.97 |
| Percent Biodegraded (%) |  | 3.7 | 87.1 | 66.4 | 80.2 | 95.8 |

FIGS. 11A-11B show that after 204 days, the negative control showed 2.5% degradation, the positive control showed 86.5% degradation, sample 1342 showed 43.3% degradation, sample 1343 showed 53.9% degradation, and sample 1344 showed 77.2% degradation. At 349 days, the degradation values are as shown in Table 10.

The biodegradation after 349 days is particularly excellent. For example, while samples including PBAT (1342 and 1343) show very good biodegradation, with the percent biodegraded being far greater than the fraction of the carbohydrate-based polymeric material included in the film, sample 1344 (see FIG. 11B) is even more surprising, showing nearly 96% biodegradation (even higher than the positive control), where the non-biodegradable plastic material is polyethylene, which under normal circumstances is of course not biodegradable (e.g., see the negative control, in Table 10 which was 100% polyethylene). Such biodegradation results are remarkable, and particularly advantageous.

Example 7

Figure 12:
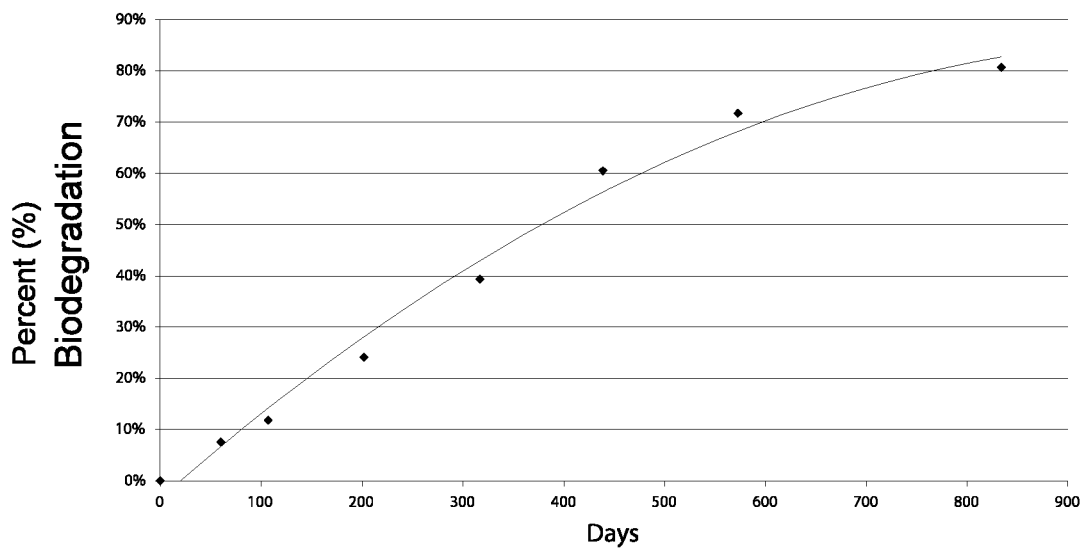
FIG. 12 shows percent biodegradation measured over 843 days according to testing conducted under ASTM D-5526 for potato bags made with 25% ESR, 70% PE, and 5% compatibilizer under simulated landfill conditions.

Potato packaging bags made with a blend of 25% ESR, 70% LLDPE and 5% compatibilizer were tested for anaerobic biodegradation after 60 days, 107 days, 202 days, 317 days, 439 days, 573 days, and 834 days according to ASTM D-5526. The test was intended to replicate the conditions of a full-scale anaerobic digester (landfill). The test was conducted under various conditions, with an inoculum having about 35%, 45%, and 60% organic solids with the balance being water. The results for the inoculum including 35% organic solids (and 65% water) are shown in FIG. 12 and Table 11A. Table 11B shows results for other inoculum values, and for other samples. The potato bags had a thickness of 1.35 mils. These bags are referred to as sample 1072.

TABLE 11A

| 35% Solids @ 60 Days | 35% Solids @ 107 Days | 35% Solids @ 202 Days | 35% Solids @ 317 Days | 35% Solids @ 439 Days | 35% Solids @ 573 Days | 35% Solids @ 834 Days |
|---|---|---|---|---|---|---|
| 7.60% | 11.80% | 24.10% | 39.40% | 60.50% | 71.70% | 80.70% |

The potato bags made with 25% ESR, and 70% LLDPE showed a remarkable 81% biodegradation over 834 days under simulated landfill conditions. The ESR is homogeneously blended with the polyethylene, and advantageously results in the long carbon chains of the polyethylene being broken up, and digested by the same microorganisms that consume the carbohydrate-based polymeric ESR material. Such results show that the entire bag, including the polyethylene is being biodegraded into carbon dioxide, methane, and water. Such results are surprising and particularly advantageous.

The testing conducted with 45% organic solids and 60% organic solids also showed results in which the percent of biodegradation exceeded the percent of ESR included in the potato bag. Tests were also run with similar potato bags including 1% of a biodegradation enhancing additive (sample 1073), and other similar potato bags including EcoFLEX™ compostable resin, and metallocene LLDPE (sample 1075).

TABLE 11B

|  | Negative Control | | | Positive Control | | |
| --- | --- | --- | --- | --- | --- | --- |
| Percent Solids | 60% | 45% | 35% | 60% | 45% | 35% |
| Percent Biodegraded @ 834 days | 1.20% | 0.5% | 1.5% | 91.2% | 91.2% | 91.4% |

|  | Sample 1072 | | | Sample 1073 | | |
| --- | --- | --- | --- | --- | --- | --- |
| Percent Solids | 60% | 45% | 35% | 60% | 45% | 35% |
| Percent Biodegraded @ 834 days | 58.3% | 67.7% | 80.7% | 54.5% | 67.9% | 80.3% |

|  | Sample 1075 | | |
| --- | --- | --- | --- |
| Percent Solids | 60% | 45% | 35% |
| Percent Biodegraded @ 834 days | 72.7% | 83.3% | 86.1% |

Example 8

Figure 13A:
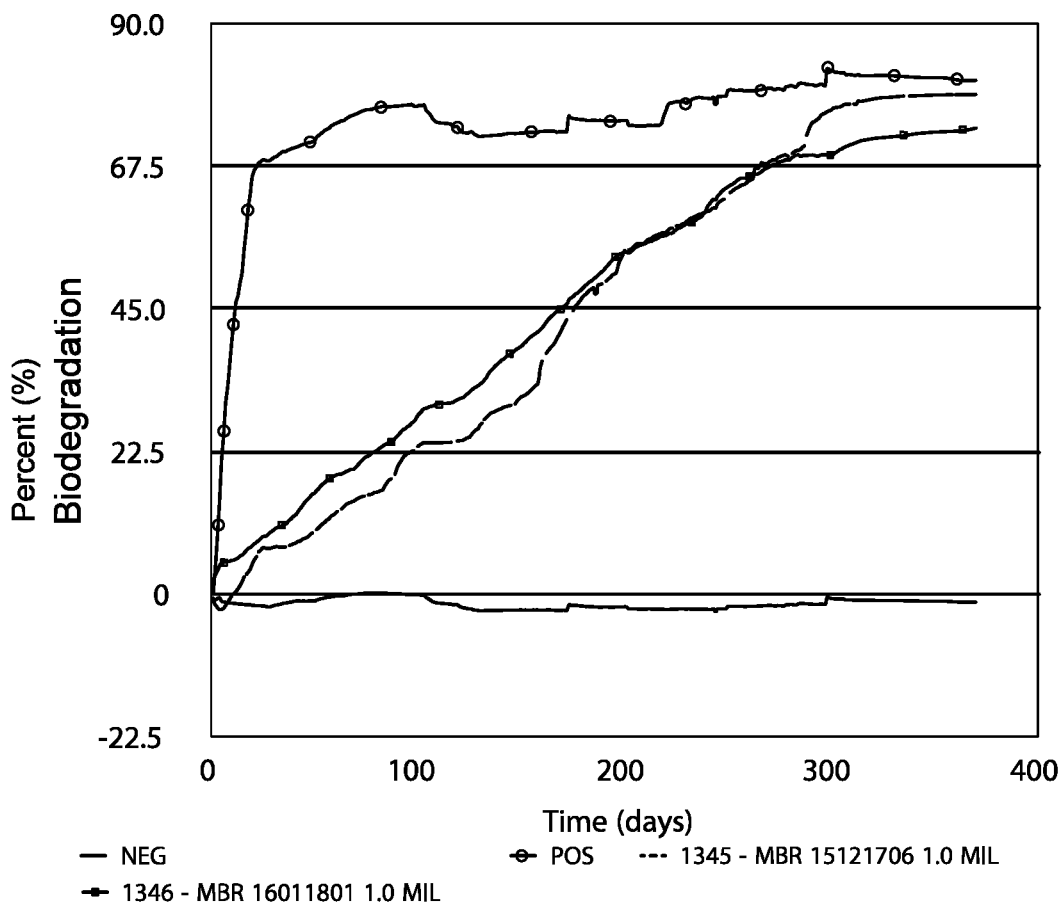
FIGS. 13A and 13B show percent biodegradation measured over 370 days according to testing conducted under ASTM D-5338 for various samples made according to the present disclosure, as well as comparative controls.
Figure 13B:
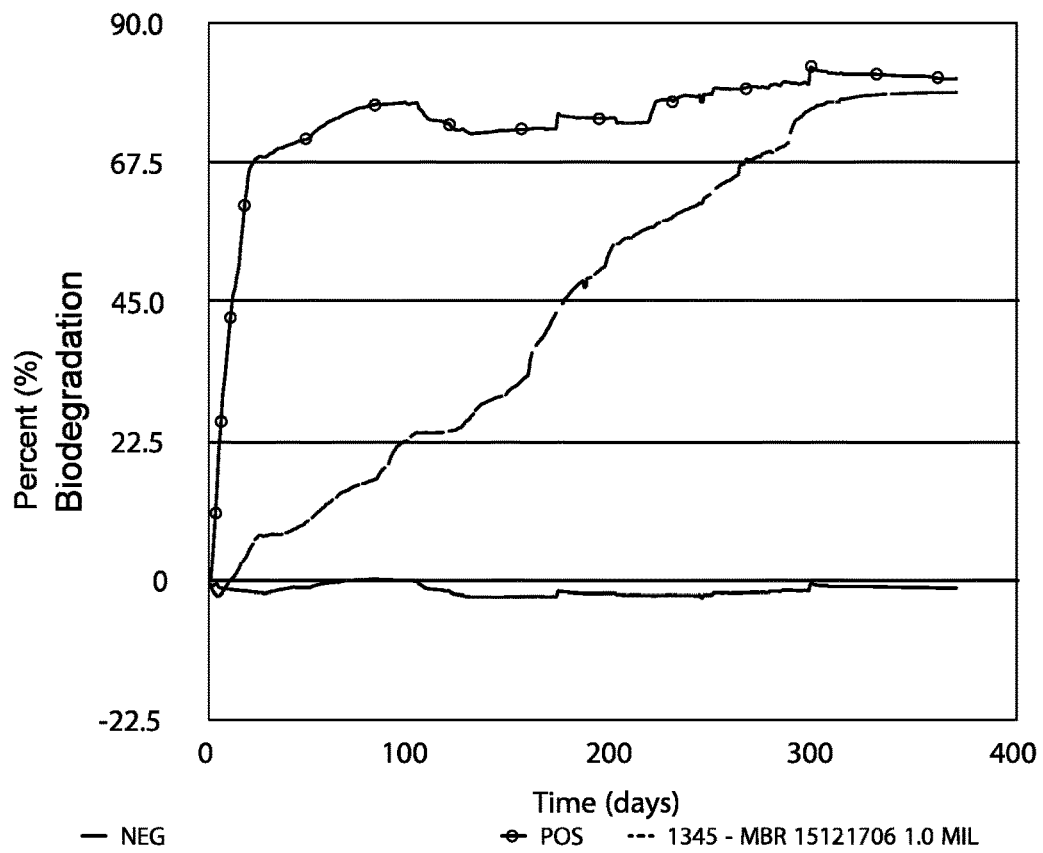

Films made with a blend of ESR and LLDPE were tested for anaerobic biodegradation after 201 days and 370 days according to ASTM D-5338. The conditions were meant to simulate aerobic digestion and/or industrial compost conditions. The tested films are labeled 1345 and 1346 in Table 12 and FIGS. 13A-13B, which show the results after 370 days. At 201 days, samples 1345 and 1346 respectively showed adjusted percent biodegraded values of 74.2% and 72.4%, while the negative control showed −3.3% and the positive control showed 100%. FIGS. 13A-13B plot actual % biodegradation. Sample 1345 included 25% ESR, 72.5% LLDPE, and 2.5% compatibilizer. Sample 1346 included 40% ESR, 56% LLDPE, and 4% compatibilizer. Both films had a thickness of 1.0 mil.

TABLE 12

|  | Inoculum | Negative | Positive | 1345 | 1346 |
| --- | --- | --- | --- | --- | --- |
| Cumulative Gas Volume (mL) | 3168.2 | 2864.3 | 10740.0 | 27603.3 | 24364.9 |
| Percent $CO_2$ (%) | 81.4 | 82.6 | 83.5 | 89.3 | 87.8 |
| Volume $CO_2$ (mL) | 2577.8 | 2366.4 | 8965.3 | 24638.1 | 21400.0 |
| Mass $CO_2$ (g) | 5.06 | 4.65 | 17.61 | 48.40 | 42.04 |
| Sample Mass (g) | 1000 | 10 | 10 | 20.0 | 20.0 |
| Theoretical Sample Mass (g) | 0.0 | 8.6 | 4.2 | 15.0 | 13.7 |
| Biodegraded Mass (g) | 1.38 | 1.27 | 4.80 | 13.20 | 11.46 |
| Percent Biodegraded (%) |  | −1.3 | 81.1 | 78.8 | 73.5 |
| Adjusted Percent Biodegraded (%) |  | −1.6 | 100.0 | 97.2 | 90.7 |

The biodegradation after 370 days, especially in sample 1345 is particularly excellent. This sample (see FIG. 13B) shows over 97% biodegradation where the non-biodegradable plastic material is polyethylene, which under normal circumstances is of course not biodegradable (e.g., see the negative control, in Table 12 which was 100% polyethylene). Such biodegradation results are remarkable, and particularly advantageous.

Example 9

Figure 14:
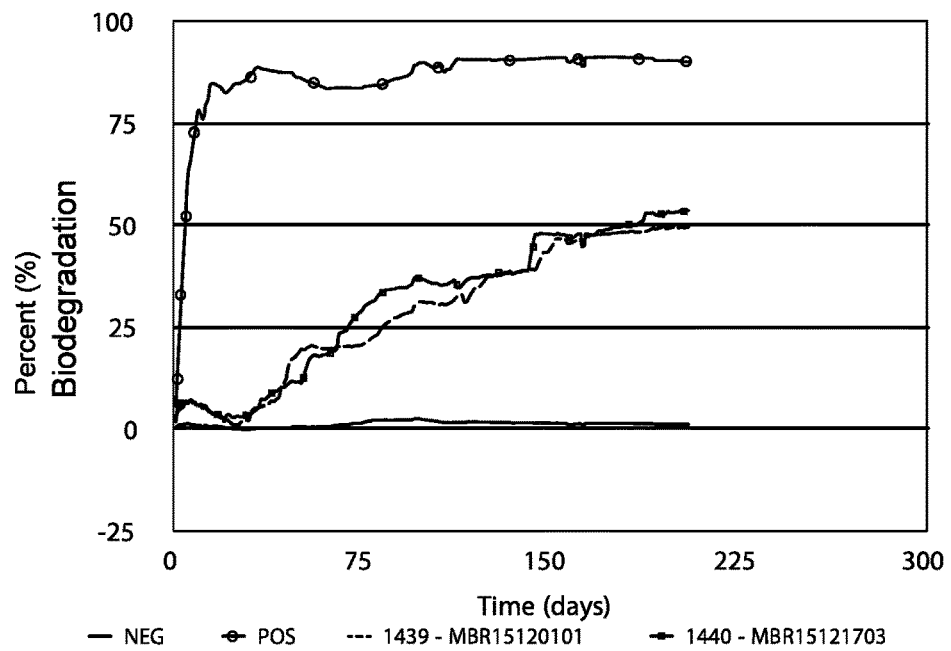
FIG. 14 shows percent biodegradation measured over 205 days according to ASTM D-6691, meant to simulate marine conditions, for various samples made according to the present disclosure, as well as comparative controls.

Films made with a blend of ESR and PBAT were tested for anaerobic biodegradation after 205 days according to ASTIVI D-6691, which is meant to simulate marine conditions. The tested films are labeled 1439 and 1440 in Table 13 and FIG. 14. At 205 days, samples 1439 and 1440 respectively showed adjusted percent biodegraded values of 49.6% and 53.6%. Sample 1439 included 30% ESR, 67% PBAT, and 3% compatibilizer. Sample 1440 included 27% ESR, 70% PBAT, and 2.5% compatibilizer. Sample film 1439 had a thickness of 1.1 mil, and sample film 1440 had a thickness of 1.0 mil.

TABLE 13

|  | Inoculum | Negative | Positive | 1439 | 1440 |
| --- | --- | --- | --- | --- | --- |
| Cumulative Gas Volume (mL) | 22.0 | 25.4 | 86.7 | 61.6 | 65.2 |
| Percent $CO_2$ (%) | 91.8 | 85.4 | 88.7 | 91.7 | 91.3 |
| Volume $CO_2$ (mL) | 20.2 | 21.7 | 76.9 | 56.4 | 59.5 |
| Mass $CO_2$ (g) | 0.040 | 0.043 | 0.151 | 0.111 | 0.117 |
| Sample Mass (g) |  | 0.080 | 0.080 | 0.080 | 0.080 |
| Theoretical Sample Mass (g) |  | 0.069 | 0.034 | 0.039 | 0.039 |
| Biodegraded Mass (g) | 0.011 | 0.012 | 0.041 | 0.030 | 0.032 |
| Percent Biodegraded (%) |  | 1.2 | 90.0 | 49.6 | 53.6 |

The films showed a greater degree of biodegradation over 205 days relative to the percentage of ESR included in the film. In other words, the long carbon chains of the polymer are being broken up, and digested by the same microorganisms that consume the starch-based polymeric ESR material.

Example 10

Additional manufactured films were tested for biodegradability. Table 14 below summarizes the results of such testing, some of which are described in detail above. Such testing shows excellent biodegradability results across a wide range of fractions of carbohydrate-based polymeric materials, and different polymeric materials, under various simulated conditions (e.g., landfills, composting, marine environments).

TABLE 14

|  | Sample 1072 | Sample MBR 16011801 | Sample MBR 15121706 | Sample MBR 16011801 | Sample MBR 16070601 | Sample MBR 15120101 | Sample MBR 15121703 |
| --- | --- | --- | --- | --- | --- | --- | --- |
| Test Condition | Landfill ASTM D-5526 | Landfill ASTM D-5511 | Compost ASTM D-5338 | Compost ASTM D-5338 | Compost ASTM D-5338 | Marine ASTM D-6691 | Marine ASTM D-6691 |

TABLE 14-continued

|  | Sample 1072 | Sample MBR 16011801 | Sample MBR 15121706 | Sample MBR 16011801 | Sample MBR 16070601 | Sample MBR 15120101 | Sample MBR 15121703 |
| --- | --- | --- | --- | --- | --- | --- | --- |
| ESR % | 25% | 40% | 25% | 40% | 40% | 30% | 27% |
| Compatibilizer + PE % | 75% | 60% | 75% | 60% | 11% | 3% | 3% |
| PBAT % | 0% | 0% | 0% | 0% | 49% | 67% | 70% |
| Thickness | 1.35 mil | 1 mil | 1 mil | 1 mil | 1.5 mil | 1 mil | 1 mil |
| Days | 573 | 204 | 201 | 201 | 59 | 205 | 205 |
| % Degraded | 71.1% | 77.2% | 74.2% | 72.4% | 96.9% | 49.6% | 53.6% |

Example 11

Additional testing was performed for evaluating biodegradability for different loading levels of the biodegradability lending carbohydrate-based polymeric material, according to the present invention. Testing was in accordance with ASTM D5511. The level of carbohydrate-based polymeric material in the tested samples was 0% (a control), 1%, 5%, 10%, and 20% by weight of the blend. Table 15 below summarizes the results of such testing. Even with 1% loading, the percentage biodegradation after 65 days (2.7%) is greater than the load amount (only 1%), indicating that the non-biodegradable plastic material (polyethylene in the test samples) is being degraded also. This trend continues in the data seen at 95 days, where the percent biodegradation continues to increase (e.g., 5% at 95 days). Similar surprising, but further accelerated results are seen at the higher loadings of 5%, 10%, and 20% of the biodegradability lending carbohydrate-based polymeric material. It is expected that in all samples loaded with the biodegradability lending carbohydrate-based polymeric material, that the entire non-biodegradable plastic content will be degraded, e.g., within a reasonable time period (e.g., within 1 year, 2 years, 3 years, 4 years, or 5 years) under such disposal conditions.

TABLE 15

| Sample No. | % ESR | Biodegradation After 65 days | Biodegradation After 95 days |
| --- | --- | --- | --- |
| 1515 | 0% | −0.1% | 1.3% |
| 1516 | 1.0% | 2.7% | 5.0% |
| 1518 | 5.0% | 7.8% | 9.4% |
| 1519 | 10% | 22.2% | 27.2% |
| 1520 | 20% | 42.5% | 50.5% |

IV. Conclusion

In closing, although the various implementations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

In closing, it is to be understood that the embodiments of the inventive features disclosed herein are illustrative of the principles of the inventive features. Other modifications that may be employed are within the scope of the inventive features. Thus, by way of example, but not of limitation, alternative configurations of the inventive features may be utilized in accordance with the teachings herein. Accordingly, the inventive features are not limited to that precisely as shown and described.

The invention claimed is:

1. A method to degrade an article comprising at least one of polyethylene, polypropylene, or polystyrene, the method comprising:
   providing the at least one of polyethylene, polypropylene, or polystyrene;
   blending the at least one of polyethylene, polypropylene, or polystyrene with one or more carbohydrate-based polymeric materials including a plasticizer to form the article, wherein the one or more carbohydrate-based polymeric materials have a crystallinity of less than about 20% and a water content no greater than 2% by weight and resists recrystallization;
   wherein the total amount of carbon atoms that become at least one of carbon dioxide or methane from about 349 days to about 5 years in simulated landfill conditions, simulated compost conditions, or simulated marine conditions is greater than the number of carbon atoms available from the article other than the at least one of polyethylene, polypropylene, or polystyrene.

2. The method of claim 1, wherein the one or more carbohydrate-based polymeric materials comprise one or more starch-based polymeric materials.

3. The method of claim 2, wherein the one or more starch-based polymeric materials are formed from one or more starches and one or more plasticizers.

4. The method of claim 3, wherein the one or more starches comprises one or more of potato starch, corn starch, or tapioca starch, and the plasticizer comprises glycerin.

5. The method of claim 3, wherein the starch-based polymeric material is formed from a blend of at least two different starches.

6. The method of claim 5, wherein the two different starches from which the starch-based polymeric material is formed include (i) one of potato starch, corn starch, or tapioca starch, and (ii) another of potato starch, corn starch, or tapioca starch, where (ii) is selected to be different from (i).

7. The method of claim 6, wherein the two different starches from which the starch-based polymeric material is formed are selected from one of the rows of the table below:

| Starch 1 | Starch 2 |
| --- | --- |
| Potato | Corn |
| Potato | Tapioca |
| Corn | Tapioca |

8. The method of claim 1, wherein the at least one of polyethylene, polypropylene, or polystyrene comprises polyethylene.

9. The method of claim 8, wherein the polyethylene is in the form of a film, the film being formed from a blend of the carbohydrate-based polymeric material and polyethylene.

10. The method of claim 1, wherein the at least one of polyethylene, polypropylene, or polystyrene comprises one or more of polypropylene or polystyrene.

11. The method of claim 1, wherein the method comprises blending 5% by weight or more of the one or more carbohydrate-based polymeric materials with the at least one of polyethylene, polypropylene, or polystyrene.

12. The method of claim 1, wherein the blend of the carbohydrate-based polymeric material with the at least one of polyethylene, polypropylene, or polystyrene includes at least 10% by weight of the carbohydrate-based polymeric material.

13. The method of claim 1, wherein the blend of the carbohydrate-based polymeric material with the at least one of polyethylene, polypropylene, or polystyrene includes from 5% to 50% by weight of the carbohydrate-based polymeric material.

14. The method of claim 1, wherein the blend of the carbohydrate-based polymeric material with the at least one of polyethylene, polypropylene, or polystyrene includes from 10% to 50% by weight of the carbohydrate-based polymeric material.

15. The method of claim 1, wherein the blend of the carbohydrate-based polymeric material with the at least one of polyethylene, polypropylene, or polystyrene includes from 20% to 40% by weight of the carbohydrate-based polymeric material.

16. The method of claim 1, wherein the blend of the carbohydrate-based polymeric material with the at least one of polyethylene, polypropylene, or polystyrene further includes a compatibilizer.

17. The method of claim 16, wherein the compatibilizer comprises no more than 10% by weight of the blend.

18. The method of claim 1, wherein the blend of the carbohydrate-based polymeric material with the at least one of polyethylene, polypropylene, or polystyrene includes from 5% to 20% by weight of the carbohydrate-based polymeric material.

19. The method of claim 1, wherein the carbohydrate-based polymeric material and the at least one of polyethylene, polypropylene, or polystyrene exhibit a lack of sea-island features when blended together to form the article.

20. A method to degrade an article comprising at least one of polyethylene, polypropylene, or polystyrene, the method comprising:
    providing the at least one of polyethylene, polypropylene, or polystyrene;
    blending the at least one of polyethylene, polypropylene, or polystyrene with at least 1% by weight of one or more carbohydrate-based polymeric materials to form the article, wherein the one or more carbohydrate-based polymeric materials are formed from a starch and a plasticizer and wherein the carbohydrate-based polymeric materials have a crystallinity of less than about 20% and a water content no greater than 2% by weight and resists recrystallization,
    wherein the total amount of carbon atoms that become at least one of carbon dioxide or methane from about 349 days to about 5 years in simulated landfill conditions, simulated compost conditions, or simulated marine conditions is greater than the number of carbon atoms available from the article other than the at least one of polyethylene, polypropylene, or polystyrene.

21. The method of claim 20 wherein the total amount of carbon atoms that become at least one of carbon dioxide or methane from at least about 439 days to about 5 years is greater than the number of carbon atoms available from the article other than the at least one of polyethylene, polypropylene, or polystyrene.

22. The method of claim 20, wherein the carbohydrate-based polymeric material and the at least one of polyethylene, polypropylene, or polystyrene exhibit a lack of sea-island features when blended together to form the article.

* * * * *